(12) United States Patent
Cuttino

(10) Patent No.: US 9,038,449 B2
(45) Date of Patent: May 26, 2015

(54) TIRE TESTING SYSTEMS AND METHODS

(71) Applicant: James F. Cuttino, Huntersville, NC (US)

(72) Inventor: James F. Cuttino, Huntersville, NC (US)

(73) Assignee: Camber Ridge, LLC, Charlotte, NC (US)

( * ) Notice: Subject to any disclaimer, the term of this patent is extended or adjusted under 35 U.S.C. 154(b) by 0 days.

(21) Appl. No.: 14/097,674

(22) Filed: Dec. 5, 2013

(65) Prior Publication Data

US 2014/0090461 A1 Apr. 3, 2014

Related U.S. Application Data

(63) Continuation-in-part of application No. 13/613,140, filed on Sep. 13, 2012, now Pat. No. 8,806,931, and a continuation-in-part of application No. 13/087,872, filed on Apr. 15, 2011, now Pat. No. 8,474,311.

(60) Provisional application No. 61/533,960, filed on Sep. 13, 2011, provisional application No. 61/587,178, filed on Jan. 17, 2012, provisional application No. 61/346,068, filed on May 19, 2010, provisional application No. 61/324,935, filed on Apr. 15, 2010.

(51) Int. Cl.
*G01M 17/02* (2006.01)

(52) U.S. Cl.
CPC ............ *G01M 17/02* (2013.01); *G01M 17/021* (2013.01)

(58) Field of Classification Search
USPC ................................................ 73/146–146.8
See application file for complete search history.

(56) References Cited

U.S. PATENT DOCUMENTS

| | | |
|---|---|---|
| 3,152,468 A | 10/1964 | Powell et al. |
| 3,948,080 A | 4/1976 | Boyd |
| 3,977,243 A | 8/1976 | Yamada et al. |
| 4,593,557 A | 6/1986 | Oblizajek et al. |
| 4,953,392 A * | 9/1990 | Barson ............................. 73/146 |
| 5,970,438 A | 10/1999 | Clark et al. |
| 6,016,695 A * | 1/2000 | Reynolds et al. ............... 73/146 |
| 6,050,876 A | 4/2000 | Ouyang et al. |
| 6,119,514 A * | 9/2000 | Piacente et al. ................. 73/146 |

(Continued)

OTHER PUBLICATIONS

Shrini K. Upadhyaya, Dvoralaio Wulfsohn; An Overview of Traction Research at University of California, Davis; Paper published by: California Agriculture dated Mar.-Apr. 1989.

(Continued)

*Primary Examiner* — Andre Allen
(74) *Attorney, Agent, or Firm* — Clements Bernard PLLC; Christopher L. Bernard; Lawrence A. Baratta, Jr.

(57) ABSTRACT

A manipulator assembly for moving and displacing a tire undergoing tire testing, including: a linear actuator for moving and displacing the tire along a local vertical z-axis; a linear actuator for moving and displacing the tire along a local lateral y-axis that is substantially perpendicular to the local vertical z-axis; a rotary actuator for cambering the tire within a local coordinate system partially defined by the local vertical z-axis and the local lateral y-axis; and a linear actuator for moving and displacing the tire along a global lateral y-axis that is substantially perpendicular to the local vertical z-axis such that the local coordinate system is moved and displaced along the global lateral y-axis. Specifically, the linear actuator for moving and displacing the tire along the global lateral y-axis moves and displaces an origin of the local coordinate system along the global lateral y-axis.

8 Claims, 25 Drawing Sheets

(56) References Cited

U.S. PATENT DOCUMENTS

| | | |
|---|---|---|
| 6,417,918 B1 | 7/2002 | Anno et al. |
| 6,513,372 B2 | 2/2003 | Anno et al. |
| 6,578,275 B1 | 6/2003 | Oelmoro et al. |
| 6,581,448 B2 | 6/2003 | Kimbara et al. |
| 6,615,649 B1 | 9/2003 | Kokubu et al. |
| 6,779,391 B2 | 8/2004 | Bosl |
| 6,871,597 B1 | 3/2005 | Hughes |
| 6,988,397 B1* | 1/2006 | Delmoro et al. ............ 73/146 |
| 7,340,946 B2 | 3/2008 | Gotou et al. |
| 7,353,701 B2 | 4/2008 | Pellerin et al. |
| 7,784,334 B2* | 8/2010 | Friske ................... 73/117.01 |
| 7,946,164 B2 | 5/2011 | Schraudolf et al. |
| 2001/0006002 A1 | 7/2001 | Ueda et al. |
| 2001/0032499 A1* | 10/2001 | Jenniges et al. ............ 73/146 |
| 2004/0016293 A1* | 1/2004 | Weiss ........................ 73/146 |
| 2007/0004319 A1 | 1/2007 | Poling, Sr. et al. |
| 2008/0282789 A1 | 11/2008 | Regis et al. |
| 2009/0012763 A1 | 1/2009 | Langer et al. |
| 2010/0031740 A1* | 2/2010 | Olex et al. .................. 73/146 |
| 2011/0000292 A1 | 1/2011 | Yoshikawa et al. |
| 2011/0048120 A1 | 3/2011 | Dank et al. |
| 2014/0260583 A1* | 9/2014 | Vernyi et al. ............... 73/146 |
| 2014/0366617 A1* | 12/2014 | Coulter et al. ............. 73/146 |

OTHER PUBLICATIONS

Ray Meyer (Web Curator); Aircraft Landing Dynamics Facility (ALDF)—Facilities & Capabilities; Website: http://gftd.larc.nasa.gov/facilities/aldf.html; Website last updated: Mar. 4, 2011.

Lindsay Crouch of the Researcher News, "NASA—ALDF Celebrates 50 Years"; Langley Research Center; Website: http://www.nasa.gov/centers/langley/news/researchernews/rn_aldf.html; Last updated: Feb. 24, 2010.

* cited by examiner

TIRE TESTING SYSTEMS AND METHODS

CROSS-REFERENCE TO RELATED APPLICATION(S)

The present patent application/patent is a continuation-in-part (CIP) of U.S. patent application Ser. No. 13/613,140, filed on Sep. 13, 2012, and entitled "TIRE TESTING SYSTEMS AND METHODS," which is a CIP of U.S. patent application Ser. No. 13/087,872 (now U.S. Pat. No. 8,474, 311), filed on Apr. 15, 2011, and entitled "TIRE TESTING SYSTEMS AND METHODS," which claims the benefit of priority of U.S. Provisional Patent Application No. 61/324, 935, filed on Apr. 16, 2010, and entitled "RAILED TIRE TESTING FACILITY," U.S. Provisional Patent Application No. 61/346,068, filed on May 19, 2010, and entitled "CAROUSEL TIRE TESTING FACILITY," and U.S. Provisional Patent Application No. 61/414,625, filed on Nov. 17, 2010, and entitled "CARRIAGE AND OTHER ENHANCEMENTS FOR TIRE TESTING," the contents of all of which are incorporated in full by reference herein. U.S. patent application Ser. No. 13/613,140 also claims the benefit of priority of U.S. Provisional Patent Application No. 61/533,960, filed on Sep. 13, 2011, and entitled "TIRE TESTING SYSTEMS AND METHODS" and U.S. Provisional Patent Application No. 61/587,178, filed on Jan. 17, 2012, and entitled "RAILED TIRE TESTING FACILITY," the contents of both of which are also incorporated in full by reference herein.

FIELD OF THE INVENTION

The present invention relates generally to tire testing systems and methods for evaluating the performance of tires, and thereby enhancing the performance of vehicles and the like. The present invention also relates generally to vehicle simulation.

BACKGROUND OF THE INVENTION

Tire performance is easily one of the most significant parameters dictating vehicle performance, and has therefore resulted in extensive tire testing needs at both tire and automotive development and manufacturing facilities. Tire testing equipment has progressed significantly, evolving from single-drum machines and twin-roller test sets to flat-track machines with a flat running surface and higher slip angle capacities.

However, in recent years, three developments in tire testing needs have, for the most part, gone unaddressed. The first is the fact that, during the past two decades, there have been a number of events which have caused federal regulators (Congress and the U.S. National Highway Traffic Safety Administration, or NHTSA), public interest groups, the military, and the media to focus on consumer safety related to tires, vehicle handling, and rollover. This concern for safety has resulted in revised and updated federal motor vehicle safety standards for tires (the TREAD Act, for example) and regulations related to dynamic rollover testing for vehicles.

A second significant need has surfaced with recent technological advances that have been made in the automotive industry, including "smart" technologies such as electronic stability control (ESC), automatic parking systems, and adaptive cruise control. Testing of ESC systems in particular has indicated that single vehicle crashes may be reduced by 34% for passenger cars, and 59% for sport utility vehicles, resulting in 5,300 and 9,600 lives saved annually, respectively. In response to these data, NHTSA issued a new regulatory rule in April of 2007 entitled FMVSS-126; Electronic Stability Control Systems, that requires all vehicles under 10,000 lbs to be equipped with ESC systems. The NHTSA regulation requires the performance of a prescribed "sine and dwell" steering maneuver test" to determine the vehicle's ability to prevent loss of control and rollover events. The regulation was phased in beginning in 2009, when 55% of the vehicles manufactured were to comply with the regulation, and it reached full compliance on Sep. 1, 2011. The military is also heavily involved in conducting tests to prevent rollover events, a significant cause of injuries and fatalities during deployment.

In order to meet the FMVSS-126 criteria, vehicle manufacturers have the option of building multiple prototype vehicles for testing, a very expensive process, or investing in simulation capabilities which enable faster design convergence and time to market, reduced labor costs, and reduced prototyping costs. However, a key component to simulation is accurate tire data. Current tire testing machines are extremely limited in slip angles and steer rates, as well as dynamic loading capabilities, and are therefore inadequate for simulating the maneuvers required by FMVSS-126.

A third demand driver is provided by the racing industry, where high speeds, horsepower, and hard braking into a corner provide extreme loads to the tire. None of the current tire testing facilities have the ability to generate longitudinal (driving or braking) loads of sufficient magnitude and speeds to emulate racing conditions. This has become more and more important, particularly in racing venues like NASCAR and Formula One, to ensure the safety of the driver and performance of the tire under various racing conditions. The stakes are further elevated by the fact that some races generate $100 million to the local economy, and delays or cancellations caused by failure of a component are often televised nationally and internationally.

Along with these three principal drivers, various OEM's have historically expressed interests in other testing capabilities as well including modeling various terrains and surfaces (for example, wet roads, ice, and sand/mud applications) and hardware in the loop (HIL) capabilities (for more accurately simulating braking systems, etc.). These are not currently available on conventional testing machines.

BRIEF SUMMARY OF THE INVENTION

In one exemplary embodiment, the present invention provides a tire testing system, including: a first rail and a second rail; a carriage assembly coupled to the first rail and the second rail such that five degrees of freedom of motion of the carriage assembly are thereby constrained; a first bogie assembly coupling the carriage assembly to the first rail such that at least lateral, pitch, and yaw motions of the carriage assembly are thereby constrained; and a second bogie assembly coupling the carriage assembly to the second rail such that at least vertical and roll motions of the carriage assembly are thereby constrained; wherein the carriage assembly translates in a direction that is tangential to the first rail. This configuration makes the tire testing system advantageously insensitive to the parallelism of the two rails, their thermal expansion, etc. The tire testing system also includes a tire articulation system coupled to the carriage assembly, wherein the tire articulation system includes a dedicated actuator for each degree of freedom of motion of a test tire coupled thereto. This assembly represents the constraints of a typical vehicle. Each of the dedicated actuators includes at least one of a force-based actuator and a displacement-based actuator. Optionally, for example, the tire articulation system may further include a lateral motion mechanism that is actuated by a displacement-based actuator, a vertical elevator that is actuated by a force-based actuator, a torque mechanism that is actuated by a force-based actuator, a camber mechanism that is actuated by a displacement-based actuator, and a steering mechanism that is actuated by a displacement-based actuator, although there may be applications requiring different actuator types for any of the degrees of freedom. Optionally, the tire articulation system includes an arcuate camber bearing that has a fixed radius, such that it rotates exactly on center for only a single sized tire. Test tires of different sizes are accommodated by the camber bearing by compensation with lateral motion, which serves to eliminate any "scrub." Optionally, the carriage assembly is translated with respect to the first rail and the second rail by rotation of a test tire coupled to the carriage assembly with respect to a road surface. Optionally, the carriage assembly is translated with respect to the first rail and the second rail by rotation of a drive tire coupled to the carriage assembly with respect to a road surface. Optionally, the carriage assembly is translated with respect to the first rail and the second rail by rotation of a pair of drive tires coupled to the carriage assembly with respect to a fin structure disposed on a road surface. Optionally, the carriage assembly is translated with respect to the first rail and the second rail by a drive mechanism coupled to the carriage assembly and one or more or the first rail and the second rail. Optionally, the carriage assembly is translated with respect to the first rail and the second rail by a cable system coupled to the carriage assembly. Optionally, the first rail and the second rail each include a plurality of rigidly connected (e.g. welded) segments that prevent disturbances in the system caused by expansion joints, for example. Optionally, the first rail and the second rail each define a slight bow, which also helps to preserve rail alignment while allowing for deflection, thermal expansion, etc. Optionally, the carriage assembly further includes a cutting or dressing apparatus for removing imperfections in the first rail, the second rail, and/or a road surface, along with appropriate kinematic and surface-averaging systems. Optionally, the carriage assembly further includes paver and/or roller for maintaining constant distance from the first and/or second rails as a road surface is paved. Preferably, the tire testing apparatus further includes one or more of a road surface, a belt, and a drum disposed adjacent to the first rail and the second rail, optionally covered with a material similar to that used on a conventional tire testing machine (for example, 3M-ite, Polycut, or a similar abrasive material). This allows for the calibration of road surface data with belt data, for example. Optionally, the carriage assembly includes a drive wheel and a test wheel having a predetermined gear ratio between them, providing a slip ratio carriage. Advantageously, the tire testing system of the present invention follows the SAE convention for motion by default, and does not require software correction that could lead to parasitic errors. Of course, any of the components of the tire testing system may also be driven or braked, as appropriate.

In another exemplary embodiment, the present invention provides a tire testing method, including: providing a first rail and a second rail; providing a carriage assembly coupled to the first rail and the second rail such that five degrees of freedom of motion of the carriage assembly are thereby constrained; providing a first bogie assembly coupling the carriage assembly to the first rail such that at least lateral, pitch, and yaw motions of the carriage assembly are thereby constrained; providing a second bogie assembly coupling the carriage assembly to the second rail such that at least vertical and roll motions of the carriage assembly are thereby constrained; wherein the carriage assembly translates in a direction that is tangential to the first rail; and providing a tire articulation system coupled to the carriage assembly, wherein the tire articulation system includes a dedicated actuator for each degree of freedom of motion of a test tire coupled thereto.

In a further exemplary embodiment, the present invention provides a tire testing method, including: providing a first rail and a second rail; providing a road surface disposed adjacent to the first rail and the second rail; providing a carriage assembly coupled to the first rail and the second rail such that five degrees of freedom of motion of the carriage assembly are thereby constrained; providing a first bogie assembly coupling the carriage assembly to the first rail such that at least lateral, pitch, and yaw motions of the carriage assembly are thereby constrained; providing a second bogie assembly coupling the carriage assembly to the second rail such that at least vertical and roll motions of the carriage assembly are thereby constrained; wherein the carriage assembly translates in a direction that is tangential to the first rail; and providing a tire articulation system coupled to the carriage assembly, wherein the tire articulation system includes a dedicated actuator for each degree of freedom of motion of a test tire coupled thereto. Optionally, the method also includes providing one or more of a belt and a drum disposed adjacent to the first rail and the second rail, optionally covered with a material similar to that used on a conventional tire testing machine (for example, 3M-ite, Polycut, or a similar abrasive material). Optionally, the carriage assembly includes a drive wheel and a test wheel having a predetermined gear ratio between them.

In a still further exemplary embodiment, the present invention provides a tire testing system, including: one of a simulated road surface and an actual road surface; a test tire physically contacting the one of the simulated road surface and the actual road surface; and a plurality of gears linking the test tire and the one of the simulated road surface and the actual road surface, such that the velocities of the test tire and the one of the simulated road surface and the actual road surface are linked and an associated slip ratio between the test tire and the one of the simulated road surface and the actual road surface is controlled. Optionally, the simulated road surface includes one of a drum, a belt, a drive wheel, and a rail. The plurality of gears are varied in terms of gear ratio using a controller such that slip ratio is dynamically controlled and varied. Optionally, the plurality of gears include a continuously variable transmission. Optionally, the plurality of gears include a worm gear, a ring gear, and a plurality of bevel gears.

In a still further exemplary embodiment, the present invention provides a tire testing system, including: a first rail and a second rail, wherein one or more of the first rail and the second rail include separate substantially horizontal and substantially vertical plates; a carriage assembly coupled to the first rail and the second rail such that five degrees of freedom of motion of the carriage assembly are thereby constrained; a first bogie assembly coupling the carriage assembly to the first rail such that at least lateral, pitch, and yaw motions of the carriage assembly are thereby constrained; and a second bogie assembly coupling the carriage assembly to the second rail such that at least vertical and roll motions of the carriage assembly are thereby constrained; wherein the carriage assembly translates in a direction that is tangential to the first rail.

In a still further exemplary embodiment, the present invention provides a manipulator assembly for moving and displacing a tire undergoing tire testing, including: a linear actuator for moving and displacing the tire along a local vertical z-axis; a linear actuator for moving and displacing the tire along a local lateral y-axis that is substantially perpendicular to the local vertical z-axis; a rotary actuator for cambering the tire within a local coordinate system partially defined by the local vertical z-axis and the local lateral y-axis; and a linear actuator for moving and displacing the tire along a global lateral y-axis that is substantially perpendicular to the local vertical z-axis such that the local coordinate system is moved and displaced along the global lateral y-axis. The manipulator assembly is coupled to a carriage assembly, fixed mount, or other moving or fixed reference. The linear actuator for moving and displacing the tire along the global lateral y-axis moves and displaces the manipulator assembly with respect to the carriage assembly along the global lateral y-axis. The linear actuator for moving and displacing the tire along the global lateral y-axis moves and displaces an origin of the local coordinate system along the global lateral y-axis.

In a still further exemplary embodiment, the present invention provides a method for moving and displacing a tire undergoing tire testing, including: providing a manipulator assembly, including: a linear actuator for moving and displacing the tire along a local vertical z-axis; a linear actuator for moving and displacing the tire along a local lateral y-axis that is substantially perpendicular to the local vertical z-axis; a rotary actuator for cambering the tire within a local coordinate system partially defined by the local vertical z-axis and the local lateral y-axis; and a linear actuator for moving and displacing the tire along a global lateral y-axis that is substantially perpendicular to the local vertical z-axis such that the local coordinate system is moved and displaced along the global lateral y-axis; moving the tire using the manipulator assembly; and collecting performance data associated with the tire. The manipulator assembly is coupled to a carriage assembly, fixed, or other base assembly. The linear actuator for moving and displacing the tire along the global lateral y-axis moves and displaces the manipulator assembly with respect to the carriage assembly along the global lateral y-axis. The linear actuator for moving and displacing the tire along the global lateral y-axis moves and displaces an origin of the local coordinate system along the global lateral y-axis.

BRIEF DESCRIPTION OF THE DRAWINGS

The present invention is illustrated and described herein with reference to the various drawings, in which like reference numbers are used to denote like system components/method steps, as appropriate, and in which.

DETAILED DESCRIPTION OF THE INVENTION

Figure 1:
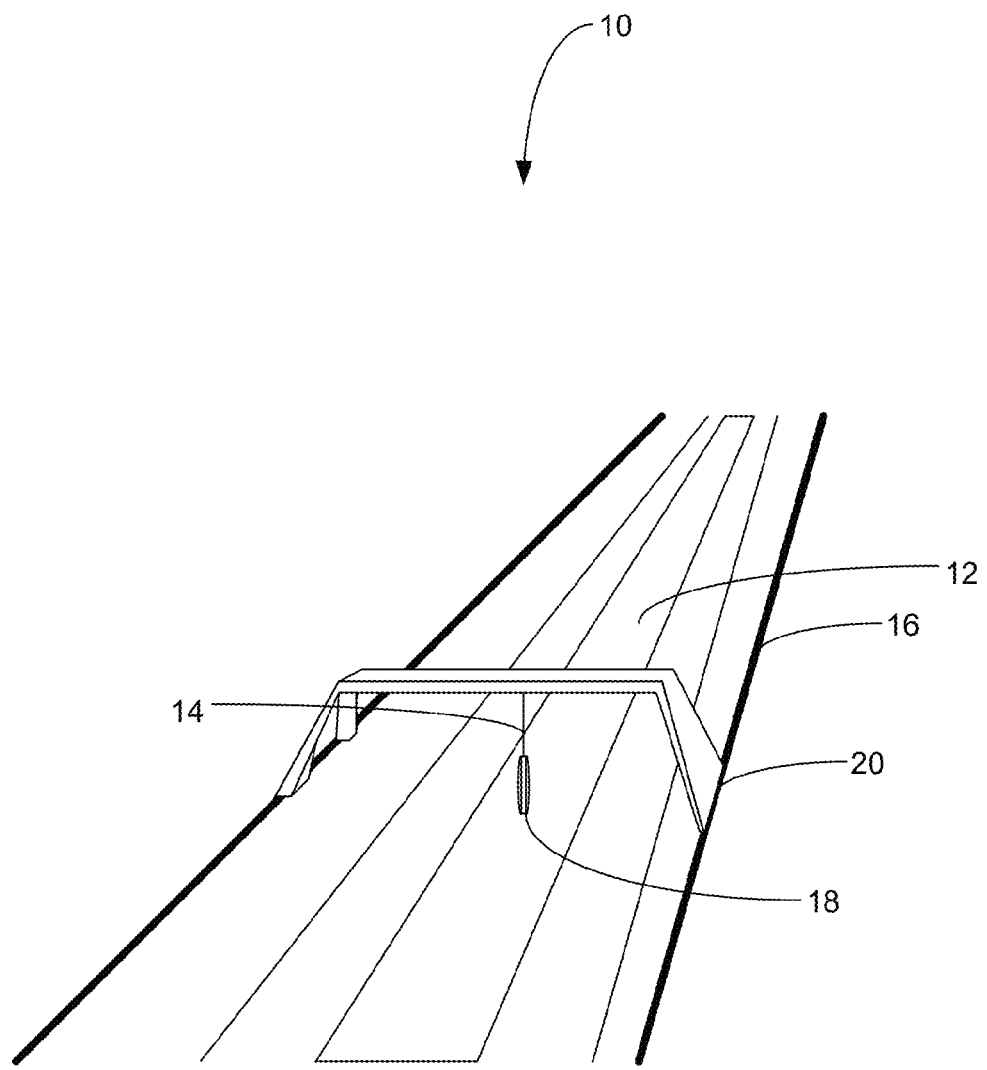
FIG. 1 is a perspective view of one exemplary embodiment of the tire testing system of the present invention.

The objective of the tire testing facility of the present invention is to provide the finest tire testing capabilities in the world for the passenger car, light truck, racing, and defense industries, among others. Specifically, this objective is met through the successful completion of the following sub-objectives:

Specifying, designing, and building a force and moment tire testing machine to address the specific needs of FMVSS-126 by providing required loads and sweep rates to emulate the sine and dwell test and other maneuvers required by the protocol;

Developing testing capabilities that allow high input torque and braking capabilities for the acquisition of longitudinal data under typical driving and racing conditions;

Providing a multi-use machine that meets or exceeds testing capabilities of current tire testing facilities in range and accuracy;

Providing a means for collecting tire data under various environmental conditions, including rain, snow, and variations in temperature;

Providing a means for determining the effects of ambient conditions on the resulting grip capacity of a tire running on a paved surface;

Providing a means for measuring tire data for heavy duty tires;

Providing the capability to conduct durability studies using cleats and other features in a paved surface;

Providing a method for comparing data from belt machines to data taken from a tire on a real road surface;

Providing a means for simulating a vehicle emergency maneuver and gathering tire force and moment data;

Providing a means for verifying tire models by collecting data under the modeled loads and displacements; and Developing "Hardware in the Loop" capabilities for tire testing, where a simulation controls inputs to the machine in real time, allowing the machine to collect data in real time and feed it back to the simulation, which in turn responds with new load and displacement commands for the machine. This capability could lead to the elimination of many test vehicles prior to production.

This represents a new approach to tire testing. Current testing instrumentation typically consists of one of several configurations: a) a single-drum roller test, b) a double-drum roller test, c) a belt-driven system, or d) a trailer-based dynamometer. The single and double-drum roller tests fail to replicate a real roadway condition, because the test tire rolls on the outside or inside diameter of the roller, thereby providing an undesirable concave or convex contact patch on the tire. In addition, the surface that the tire runs on does not resemble that of asphalt or concrete, which most roads are made of. The belt-driven systems provide a flat contact surface, but utilize either a stainless steel or 80-120 grit sandpaper surface to replicate the road surface. They also suffer from speed constraints and limits to lateral loads and steer rates. Trailer-based dynamometers are limited in load capacity, suffer from compliance and variation in the trailer, and are limited in speed.

Thus, the present invention provides a new generation of testing instrumentation which provides realistic data representing the forces and moments provided by the tire on asphalt pavement, cement pavement, or other terrains.

Figure 2:
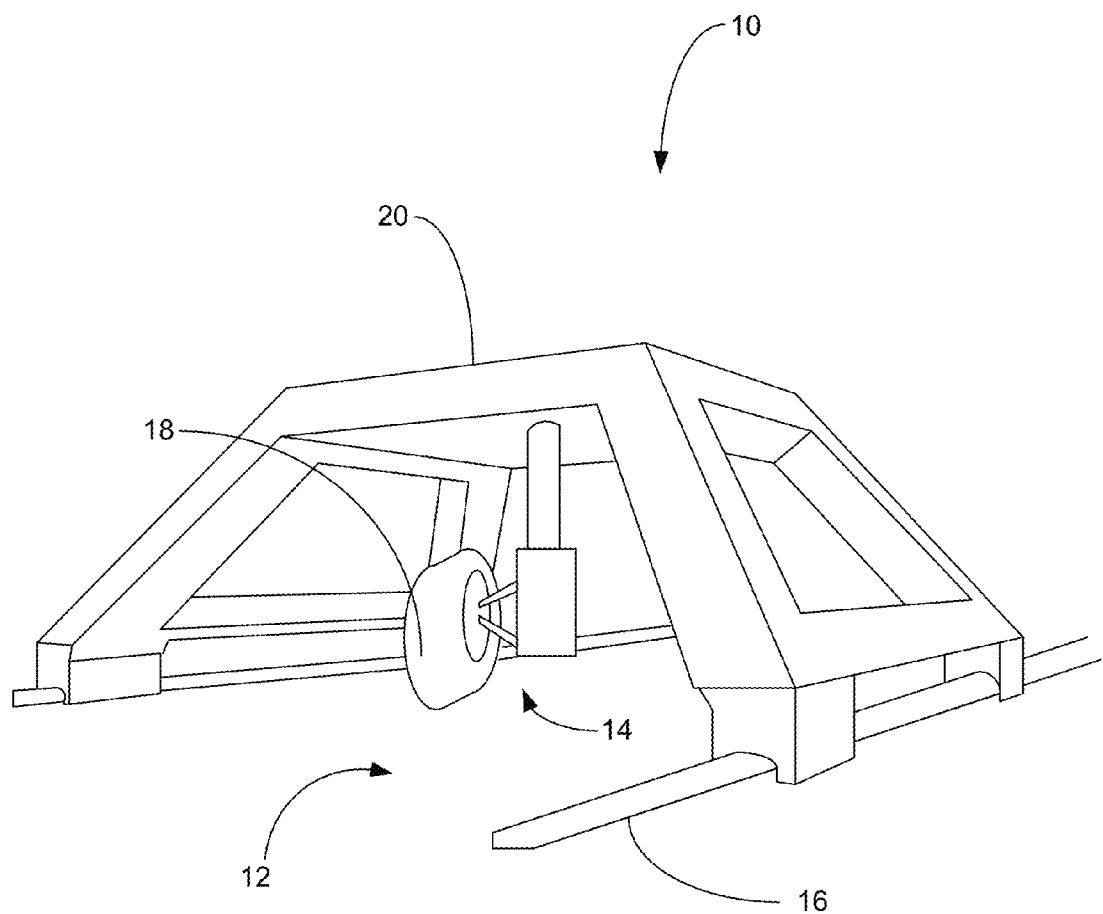
FIG. 2 is another perspective view of one exemplary embodiment of the tire testing system of the present invention.

Referring to FIGS. 1 and 2, in the design of the present invention, the road surface 12 is stationary and is paved using the same materials and methods as the road surface being emulated. The metrology head 14 translates along a railed system 16 which provides stiffness, accuracy, and repeatability to the system 10. As the tire 18 translates down the roadway 12, forces and moments are measured to assess the performance of the tire 18.

The principal advantage of this system 10 is the ability to engineer the road surface 12 to more closely emulate a real road. The tradeoff is found in the necessity to transfer power and data to and from the metrology head 14, as well as the potential for a considerably larger machine footprint. A significantly larger footprint makes it more difficult to control the environment, which can affect repeatability.

This system 10 is based, in part, on technologies developed by the roller coaster industry. This tracked design opens a new set of possibilities for tire testing, as well as suspension testing. The most obvious advantage is that of the road surface 12. In a tracked system, the roadway 12 can be paved using a conventional asphalt compound, a variety of asphalt compounds (to emulate variations across the country), and/or concrete surfaces. Interestingly, the inclusion of a rail switch (not illustrated) to change to different circuits of the track may allow sections where the track can be soaked to study wet traction, wet and frozen to emulate icy conditions, or replaced with sections for mud, sand, or other terrains.

Figure 3:
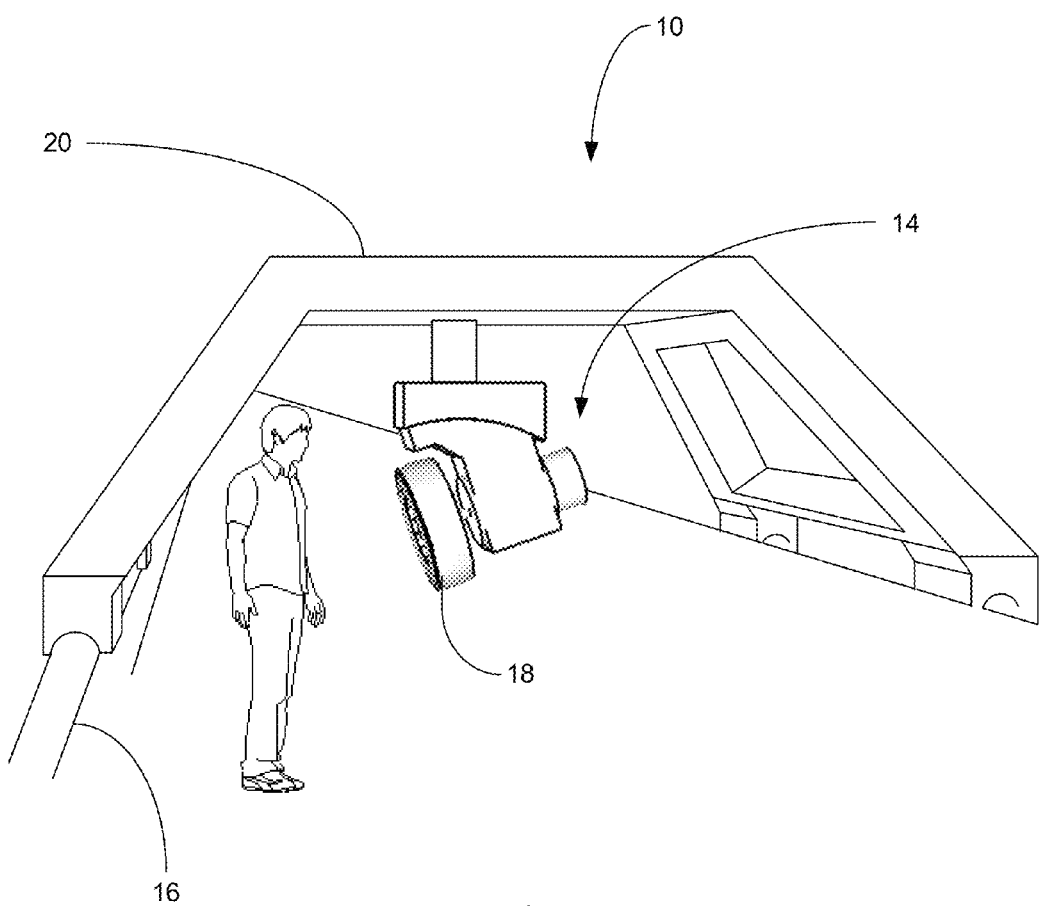
FIG. 3 is a perspective view of another exemplary embodiment of the tire testing system of the present invention.
Figure 4:
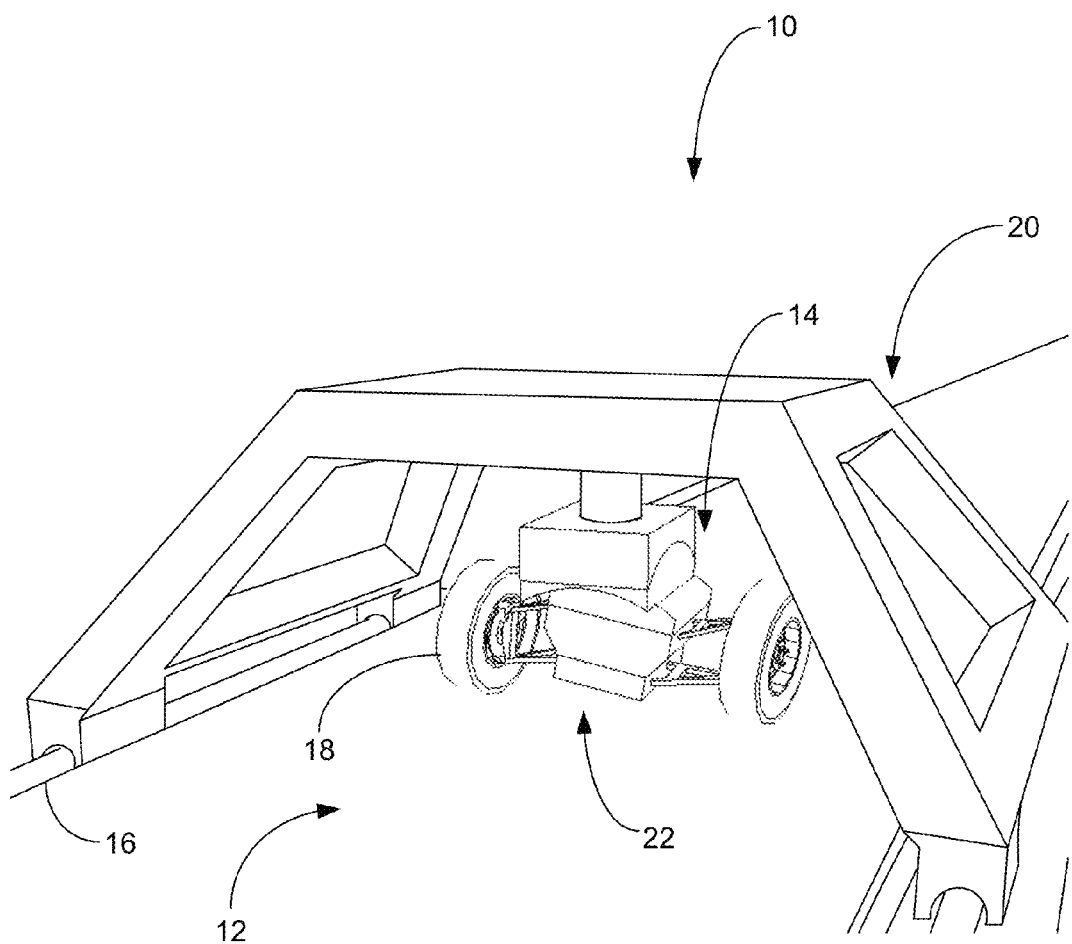
FIG. 4 is a perspective view of a further exemplary embodiment of the tire testing system of the present invention.

Modularity is a significant advantage to the system 10 of the present invention. Once the track 12 and rail 16 are laid, carriages 20 (the carts carrying the metrology head 18) can be specifically designed to address particular needs. For example, measuring rolling resistance requires very sensitive measurement, but measuring braking performance requires a much stiffer system which negates sensitivity. In this design, you can have one carriage 20 for sensitive, low friction applications and a second carriage 20 for high load conditions, for example. Some of the configurations and capabilities are listed in the following paragraphs:

Standard configuration as shown in FIG. 1, where the tire 18 rolls without a powered driving torque, but with applied steer angles and normal loads;

A high sensitivity, low load condition suitable for measuring rolling resistance;

A "soft" system with little noise suitable for measuring road noise;

Driven configuration, where the tire 18 can be driven using a hydraulic or electric motor or similar means;

The configuration shown in FIG. 3, where the rail 16 is sub-surface to facilitate easy resurfacing of the road surface 12 as well as to minimize the moment created by the tire 18;

A configuration such as that shown in FIG. 4, where a suspension system 22 is incorporated to examine the effects of coupling the tire 18 to the suspension 22. This capability may enable vehicle engineers to test new suspension concepts, as well as to tune the suspensions 22 for different maneuvers. Tunable components may be investigated, such as the JRi Controlled Damper, where damper characteristics can be actively changed while on the track. This system 10 allows very quick studies in optimizing suspension performance, so that the final production damper can be later designed to match the optimized characteristics of the controlled damper. This leads to significantly shorter times to production and reduced prototyping costs.

Figure 5:
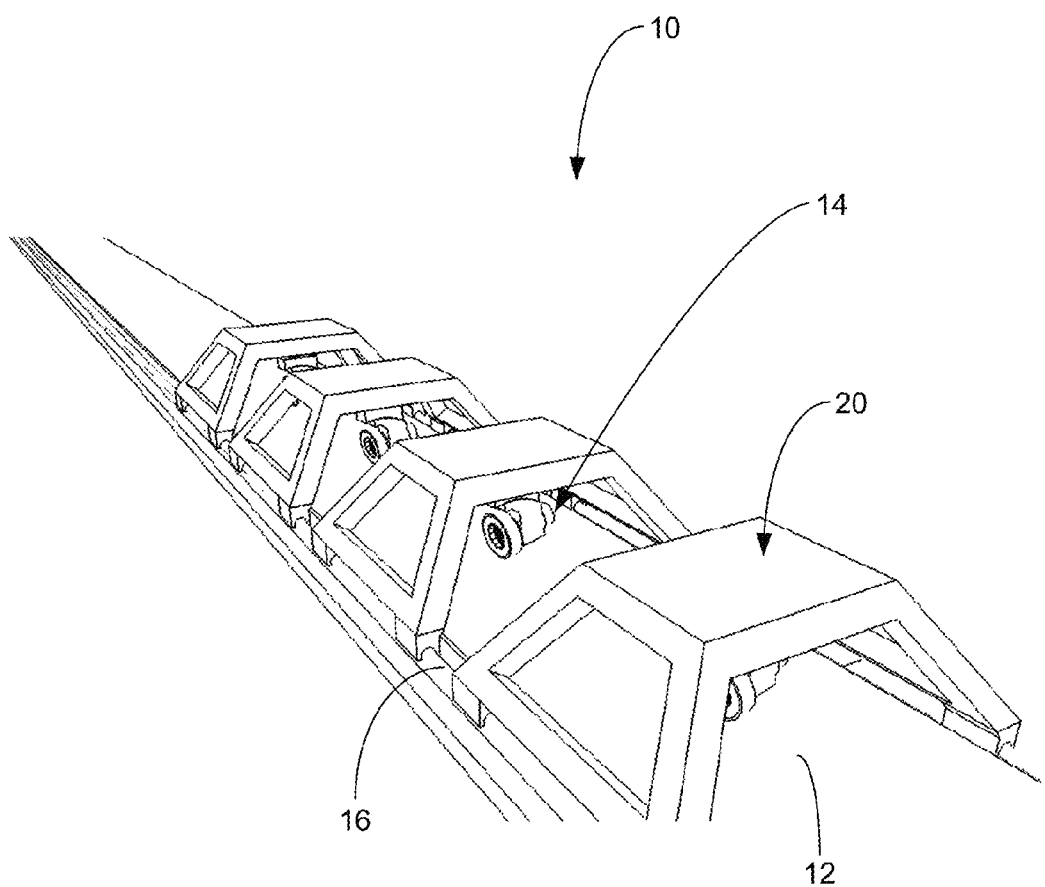
FIG. 5 is a perspective view of a still further exemplary embodiment of the tire testing system of the present invention.

With the tracked system 10, numerous carriages 20 can operate simultaneously, as shown in FIG. 5, thereby opening the possibility of not only improving throughput at the facility, but also being able to emulate all four tires 18 on a vehicle simultaneously. For example, the addition of Hardware-in-the-Loop (HIL) capabilities in the baseline specifications for the machine 10 is possible. HIL systems combine actual components and systems with computer simulations to overcome the difficulties of modeling nonlinearities, hysteresis, and other hard-to-predict losses. In the case of a tire/suspension subsystem, the machine 10 can take steering input from a simulation, apply it on the test rig to measure resulting forces and moments (which are highly nonlinear), feed that back to the simulation in real time to predict vehicle response, and feed the simulated response back into the mechanical testing system 10 to alter the applied input, such as vertical deflection. Rather than generating tire data at discrete camber angles and slip angles, the system generates the "exact" condition in real time. This capability revolutionizes the development process for vehicles, since a full suspension can be tested prior to building a prototype vehicle. In addition, since multiple carriages 20 can operate on the track 12 simultaneously, all four corners of the vehicle can be simulated, resulting in more accurate predictions of the understeer gradient, rollover events, and overall traction.

The only prior disadvantage of the tracked system 10 was primarily in controlling the environment, as well as monitoring the changing characteristics of the asphalt surface 12 as it cures and goes through heating cycles which cause the oils to rise to the surface. Accordingly, the track 12 may be covered/protected, either with a metal building, overhang, precast concrete structure, cloth structure, or inflatable structure. Obviously, this adds significantly to the cost of the facility, particularly if air conditioning is required. However, it may be feasible to cover a small circuit, say for passenger car testing, or a longer circuit used for racing applications.

Figure 6:
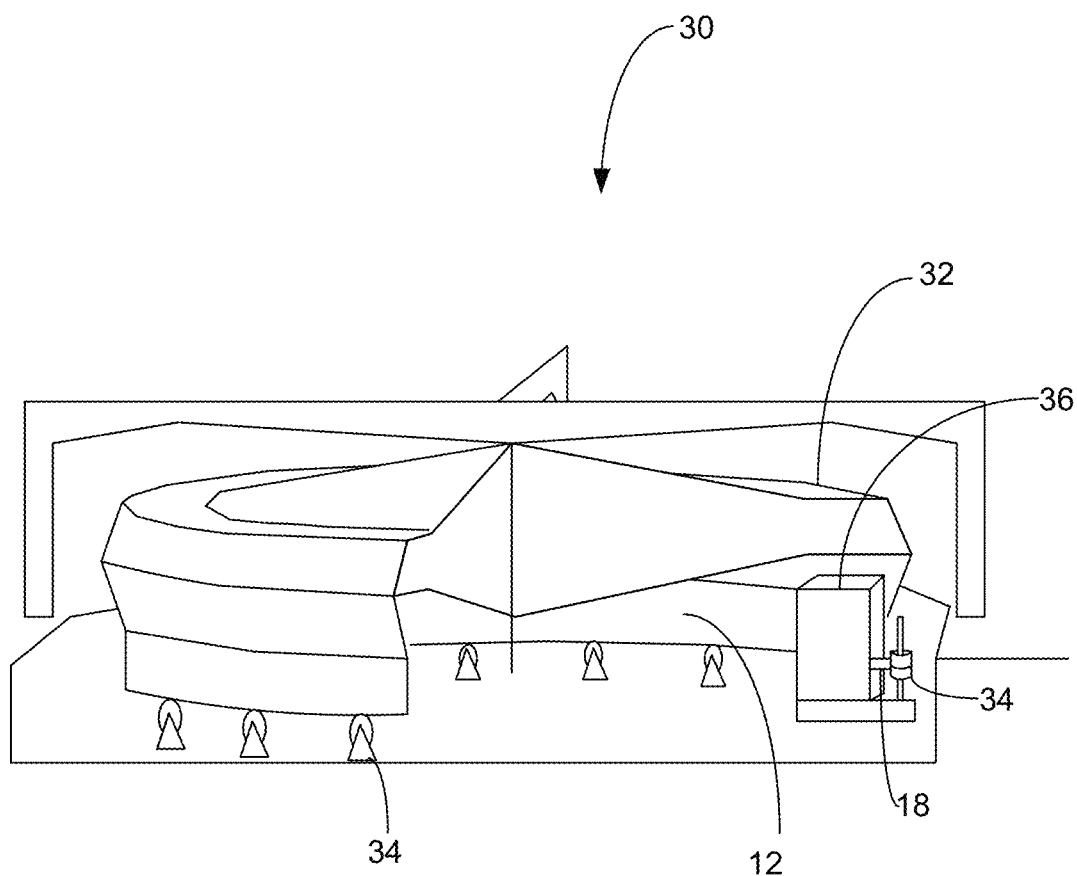
FIG. 6 is a perspective view of a still further exemplary embodiment of the tire testing system of the present invention.

Referring to FIG. 6, in an alternative exemplary embodiment, the tire testing facility 30 of the present invention involves a test tire 18 running on the inner diameter of a large circular roadway 12 supported by a carrousel structure 32. Note that FIG. 6 is conceptual only, and many details (including some of the reaction tires 34) are not included. The large forces exerted by the tire 18 on the road surface 12 are opposed primarily by reaction tires 34 running directly opposite the test tire 18 on the outer diameter of the road 12, as well as perpendicular to the test tire 18 on the edges of the roadway 12. The tire loading mechanism includes and reacts against the support tires 34, not directly against the roadway 12. This minimizes stresses within the carrousel structure 32. Moderate, coincidental forces are able to be reacted by the carousel itself 32. The carrousel 32 has a large diameter, roughly 60 feet, in order to minimize the curvature of the roadway surface 12 contacting the tire 18. The road support structure is a box cross-section ring, providing stiffness in all modes. Obviously, the only intended degree of freedom for the road/ring is pure rotation in the horizontal plane, about the center of the ring. The carrousel's motion is further controlled and stabilized by stationary high speed tires 34, along the periphery of the ring, in both axial and radial orientation. The road surface 12 is cast using a ceramic such as aluminum oxide to closely emulate various road surfaces while providing material stability and repeatability. Although not asphalt, this material can be designed to closely emulate asphalt while also being cleanable. The circular track rotates past the tire station 36. This design facilitates the inclusion of environmental controls, as it could easily fit within a 20,000 square foot facility. Multiple tire stations 36 can be utilized, and tire/suspension systems are also possible.

The key advantages of this system include:
More realistic road surface 12 than sandpaper used on many drum and belt machines;
Flatter contact patch than smaller drum machines;
High speeds, enabled by size of the structure that minimizes stresses;
Ability to control environment as opposed to an outdoor facility;
Ability to utilize multiple measurement stations; and
Ability to utilize multiple road surfaces 12 to emulate variations in asphalt across the country or other road surfaces, such as concrete.

Thus, in various exemplary embodiments, the present invention provides a tire testing system 10 (FIGS. 1-5) that utilizes the best features of current tire testing facilities while eliminating or reducing the negative features of such facilities. The resulting system 10 is one where the road surface 12 (FIGS. 1-5) is a paved, stationary, asphalt or concrete surface that removes the uncertainty of emulating a road surface since it is paved using similar techniques and materials. The articulated spindle assembly and the associated metrology (measurement) instrumentation 14 are supported on a carriage 20 which translates down a guide rail 16, as illustrated in FIGS. 1-6. The system 10 is composed of two very proven subsystems.

Figure 7:
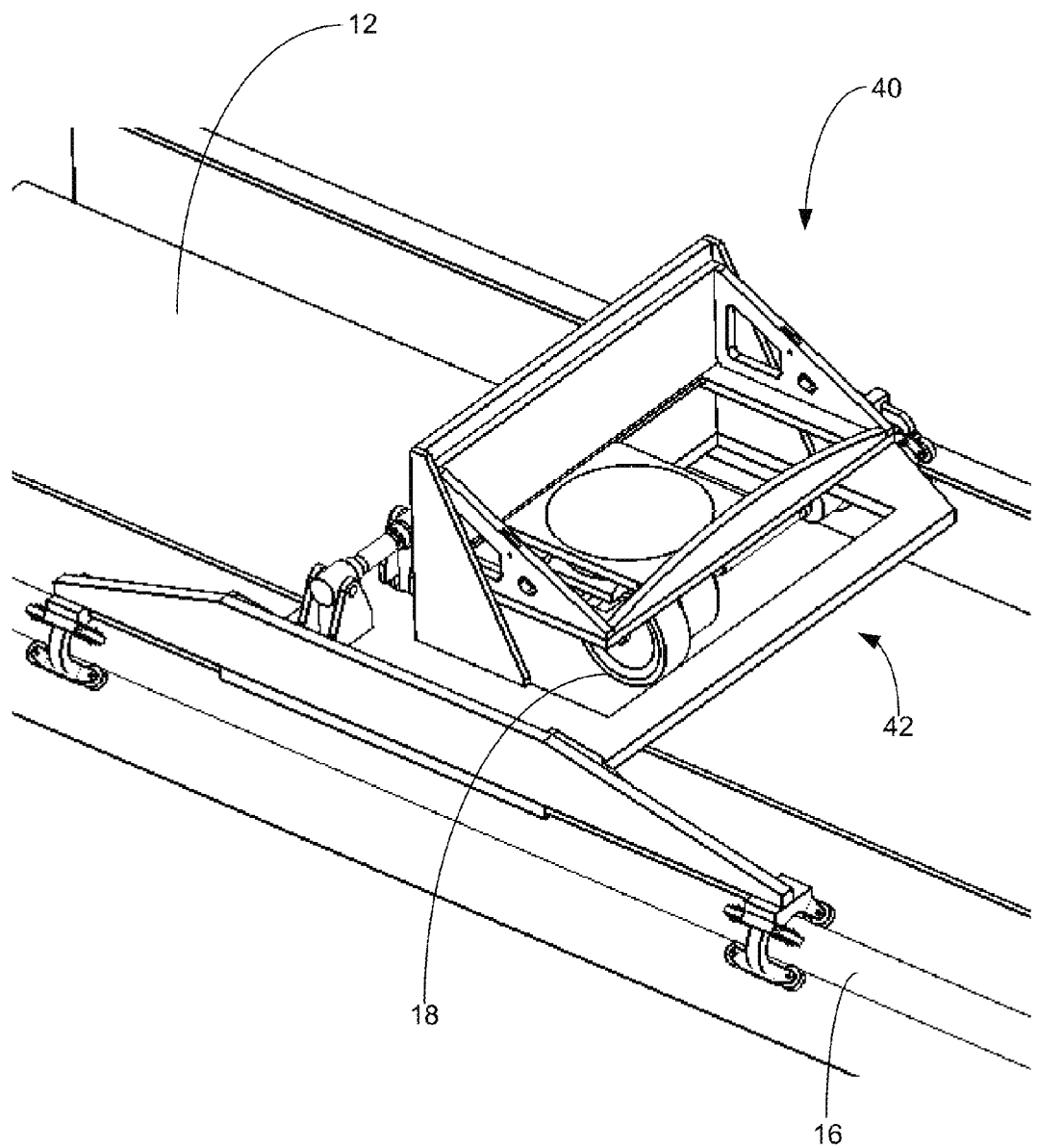
FIG. 7 is a perspective view of a still further exemplary embodiment of the tire testing system of the present invention.
Figure 8:
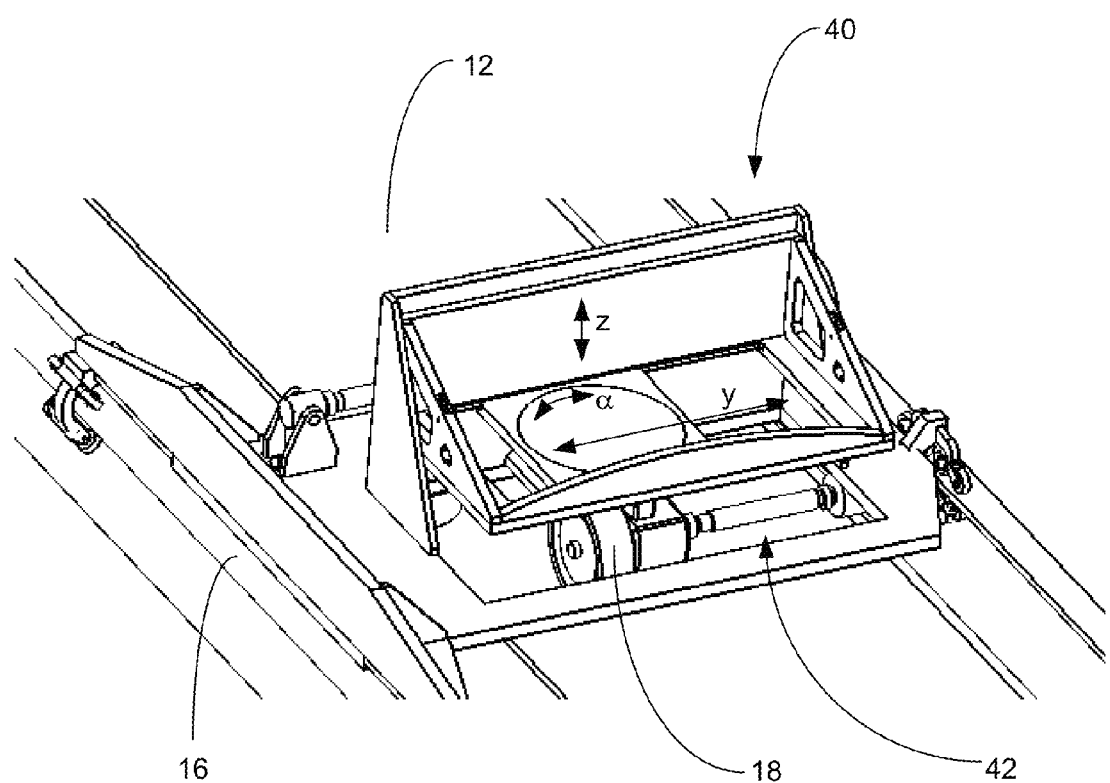
FIG. 8 is a perspective view of a still further exemplary embodiment of the tire testing system of the present invention.

Referring to FIGS. 7 and 8, in another alternative exemplary embodiment, the spindle assembly 42 is similar to that commonly found on trailer-based systems but modified to allow high rates of motion to emulate the "sine with dwell" and similar tests. The carriage and rail system 40 is similar to those found in the roller coaster industry. The concept is similar to the NASA Advanced Landing Dynamics Facility (ALDF) located at Langley Air Force Base in that it involves a carriage which supports a test tire and instrumented spindle assembly and translates down a rail.

The tire testing system 40 of the present invention may be used for the quantification and correction of tire testing grip paper degradation through a comparison with on-road data. Most lab-based tire testing systems use either drums or belts to replicate a road surface. These drums and belts are typically covered with 80 or 120 grit sandpaper or equivalent to allow the tire to grip the surface and generate similar force data to the data that come from an on-road test. Published data illustrate that the sand paper loses grip and "gives up" generating tire forces long before the tire on the road does, meaning that the sandpaper covered test surfaces quickly lose integrity depending on load, slip ratio, and even the manufacturer (different manufacturers use different binders and abrasives).

The present invention provides an on-road system 40 that can also be parked over a belt simulated road system to provide side-by-side comparisons of the grip data generated by the tire 18. This system 40 eliminates the need to change tires 18 to different measuring instruments, which would increase expense and reduce accuracies. Optionally, the "road" system surface may be covered with a material similar to that used on a conventional tite testing machine (for example, 3M-ite, Polycut, or a similar abrasive material)

Figure 9:
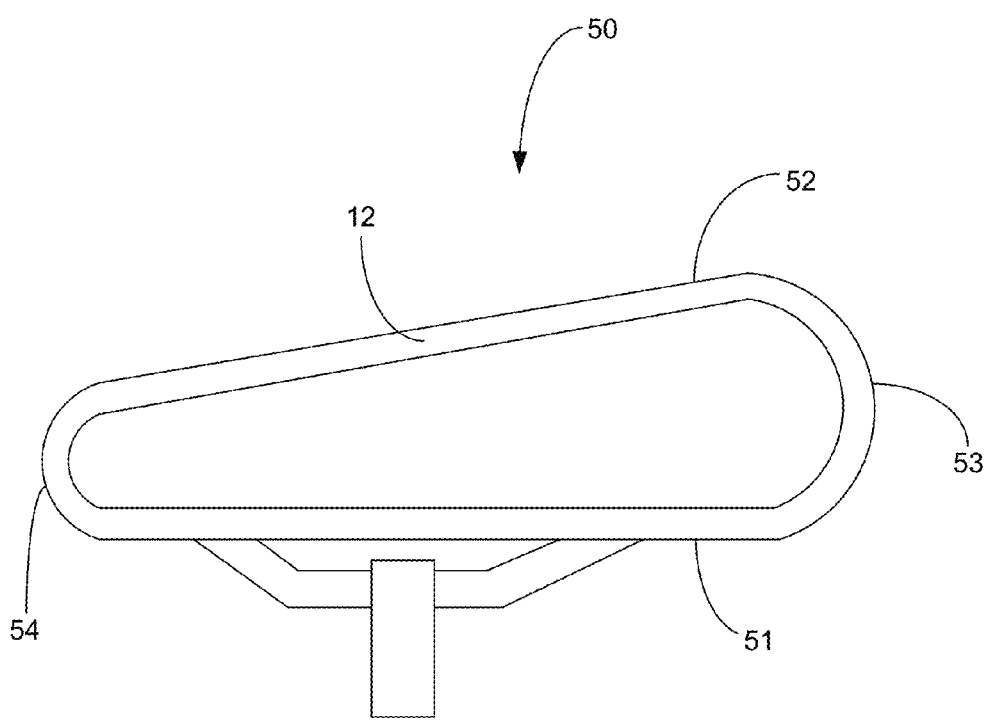
FIG. 9 is a schematic diagram illustrating one exemplary embodiment of a track configuration associated with the tire testing systems of the present invention.

The present invention also allows for the study of the effects of curve radii on tire performance and road features such as cleats and rumble strips. The track configuration provides several pertinent features. In one exemplary configuration, the overall structure resembles a teardrop shape, providing two long straightaways 51 and 52 connected by two corners 53 and 54, one of large radius 53 and the other with a tighter radius 54. This type of track 50 is shown in FIG. 9. The straightaways 51 and 52 allow for 5-8 seconds of data acquisition depending on speed, ensuring uninterrupted data flow without changes in travel trajectory. These sections 51 and 52 also allow for comparison with typical flat belt tire testing instruments, which are unable to simulate road radius in cornering situations (i.e., in real cornering, the inner part of the contact patch covers less distance than the outer due to road curvature, an effect not replicated on a belt system). The two curves 53 and 54 provide realistic cornering conditions, where the velocity vectors between the inner part and outer part of the contact patch differ. Although an infinite selection of radii is not possible, inclusion of two curves of differing radii 53 and 54 allows the industry's first look at the effects curvatures have on tire grip. In addition, progressive banking can be included in the two curves 53 and 54 to study the effect banking has on grip as well. A large number of curves with varying radii can also be included; for example, many race tracks refer to "turn 1, turn 2, turn 3, turn 4, and so on indicating that multiple radii can exist in a nominally oval track.

The inclusion of a rail switch to change to different circuits of the track 50 allows sections where the track 50 can be soaked to study wet traction, wet and frozen to emulate icy conditions, or replaced with sections for mud, sand, rocky or other terrains. It is also easy to incorporate features such as squiggle, cleats, and rumble strips in the paved surface 12.

Figure 10:
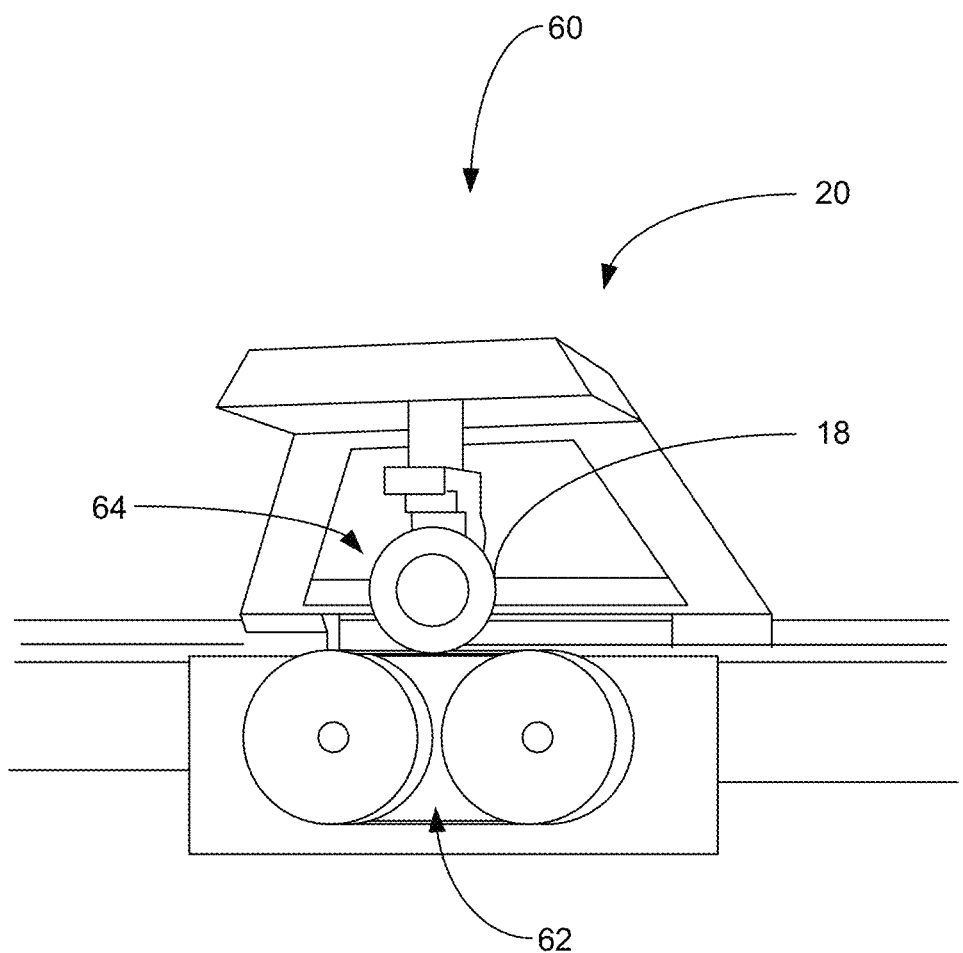
FIG. 10 is a perspective view of one exemplary embodiment of a tire warm-up station that may be used in conjunction with the tire testing systems of the present invention.

Referring to FIG. 10, in a further alternative exemplary embodiment, the tire testing facility of the present invention allows for the direct calibration of a tire 18 running on a stationary drum, belt, or other testing machine 62 with a tire 18 running on real asphalt. A flat belt system 60 is incorporated in the track circuit as a "warm-up station," allowing for the calibration of road-based data directly with flat-belt data.

Given the changes in environmental conditions on the outdoor track, ensuring repeatability is given highest priority. The solution is simple. Grit paper similar to that used on the stationary machines (80- or 120-grit 3M-ite, for example) can be glued to the track surface so that the tire can be run over the surface at speed and the results compared to the results from the lab machine. There will be small differences due to the therma cooling or heating that occurs on belt and drum machines and not on asphalt, but these can be calibrated. Alternatively, prior to entering the circuit, the carriage 20 is positioned in an environmentally-controlled room over a flat belt roller 62 and locked in place, effectively turning the system 60 into a standard flat-belt testing system. The tire 18 and belt 62 accelerate to speed, warm up, and run through a prescribed testing cycle while acquiring data using the instrumented spindle 64. Once the warm-up cycle is completed, the shuttle 20 exits the room and enters the track, where it repeats the same cycle on real pavement. Note that the same measurement system/spindle 64 is used for both indoor and track based testing, reducing or eliminating errors from using two different systems.

This procedure not only ensures repeatability for the tests, but provides a means for baselining each tire 18 in the controlled environment prior to testing on the track. Tire performance can then be assessed under a variety of ambient conditions representative of those that will exist on the highway, thereby providing the vehicle designer with a performance envelope from which best and worst case scenarios can be replicated. In addition, a witness tire program can be implemented which will allow assessment of changes to pavement/tire grip characteristics as ambient conditions and the road surface change.

Figure 11:
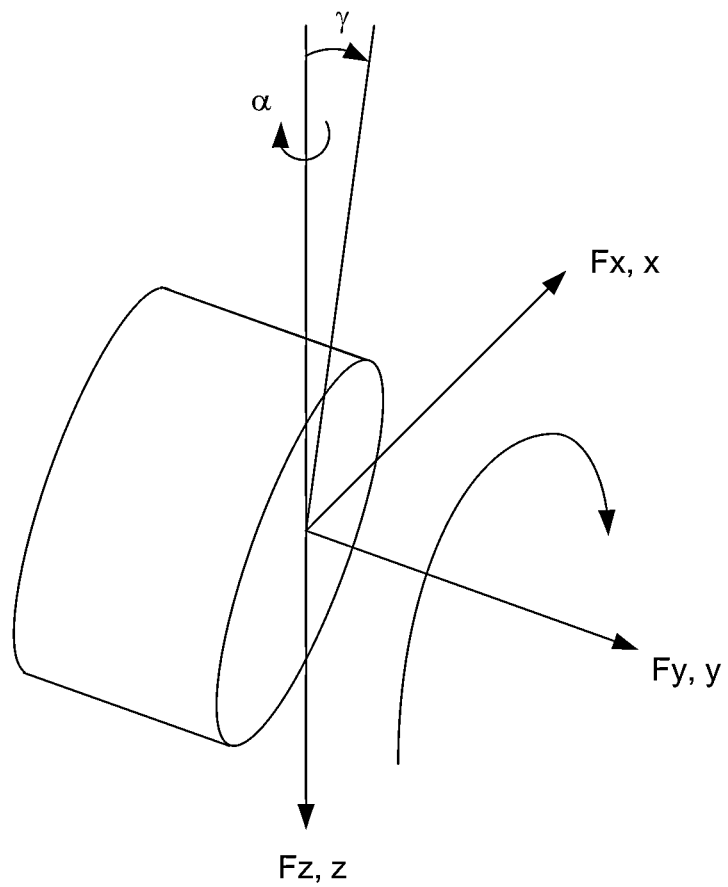
FIG. 11 is a schematic diagram illustrating the system constraints required to emulate vehicular constraints on a tire.

In general, the tire testing systems 10, 40, and 60 of the present invention provide an optimally-constrained instrumented test spindle. In order to minimize system uncertainty, the carriage 20 is used to apply the same kinds of constraints to the tire 18 that the vehicle would normally provide. This is shown in FIG. 11. A vehicle provides loading to the tire through the spindle, with the independent parameters being the longitudinal force, Fx, (representing the inertia of the vehicle), lateral force, Fy, (representing the lateral inertia of the vehicle), normal force, Fz, (representing gravitational forces), applied torque, Ty, (representing driving and braking torques), slip angle, $\alpha$, and camber, $\gamma$. Since the lateral force is determined by slip angle rather than steer angle or vehicle heading, it is appropriate to substitute lateral force with lateral displacement, y, as a constraint. Obviously, the applied forces are opposed in the contact patch.

The carriage and rail system 10, 40, and 60 is ideal for replicating these constraints on the tire 18. Actuation can be simplified and optimized to match the load or displacement constraints; for example, hydraulic or pneumatic actuators can be used to apply the normal (gravitational) loading, while ball or lead-screw actuators are optimal for displacement actuation. With this philosophy, the load inputs are provided through linear induction motors or traction drives on the carriage 20 for Fx, pneumatic or hydraulic actuators for Fz, and an electric drive for torque. The rail 16 provides constraint of the lateral displacement, while screw type actuators drive the camber and slip angles. Using this approach, the vehicle can be fully replicated.

Figure 12:
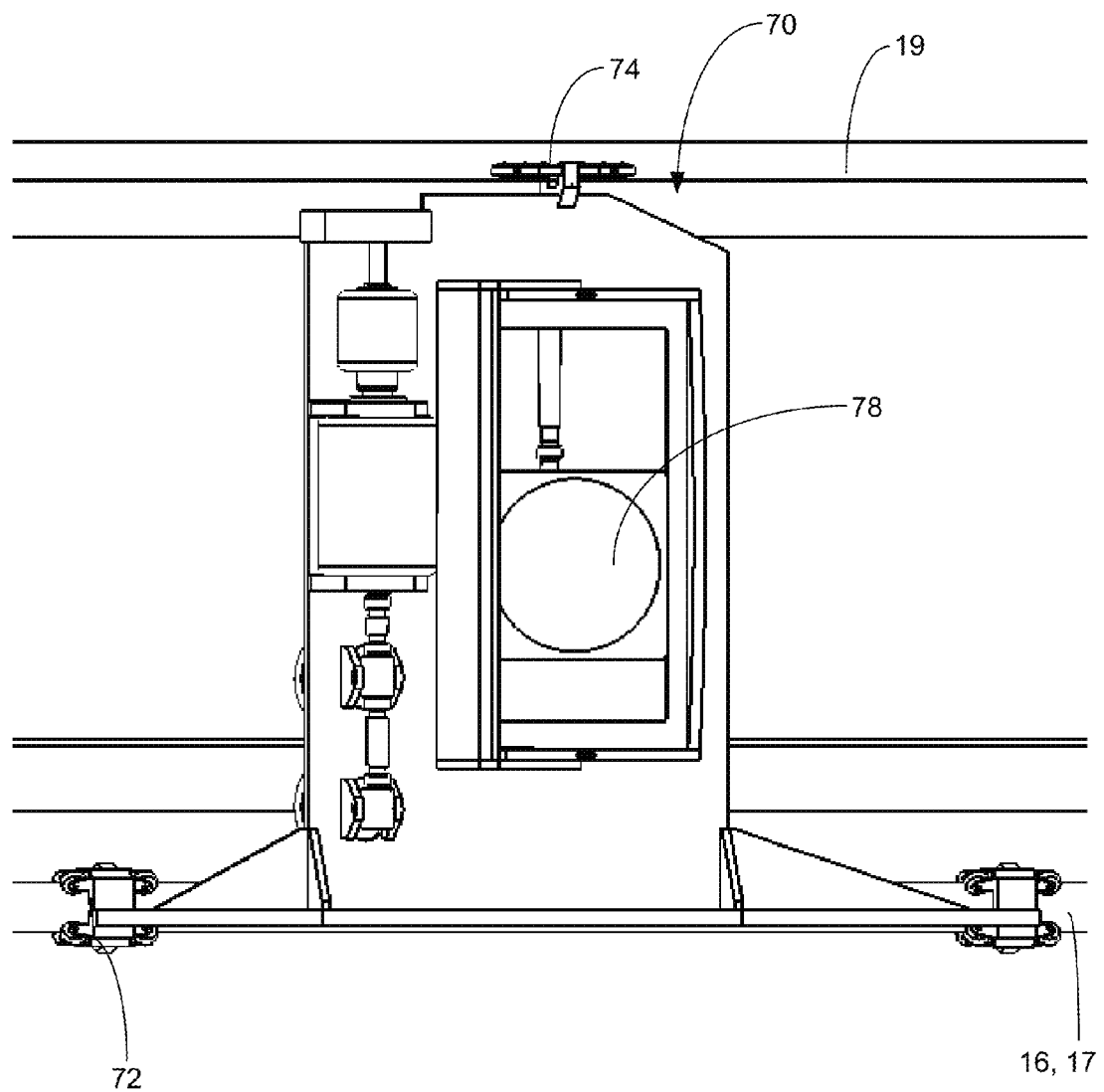
FIG. 12 is a top planar view of one exemplary embodiment of a carriage of the tire testing systems of the present invention.
Figure 13:
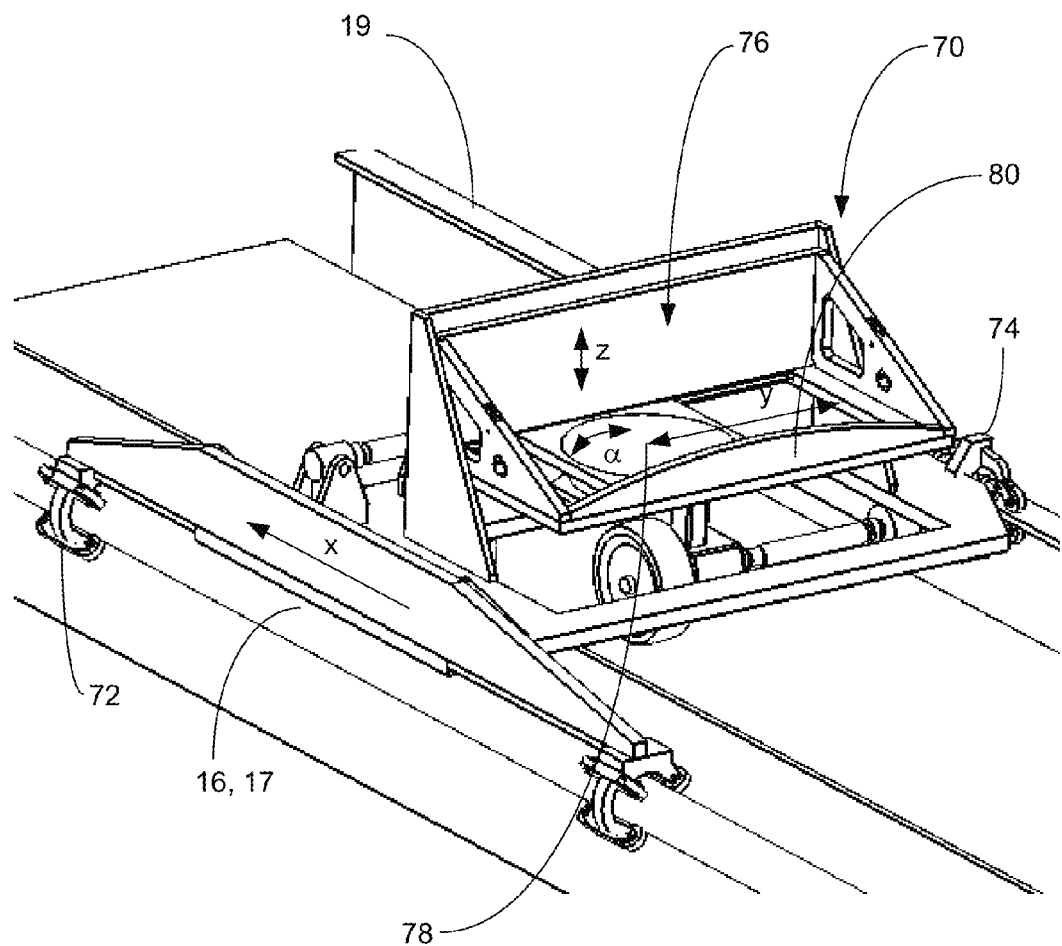
FIG. 13 is a perspective view of one exemplary embodiment of a carriage of the tire testing systems of the present invention.
Figure 14:
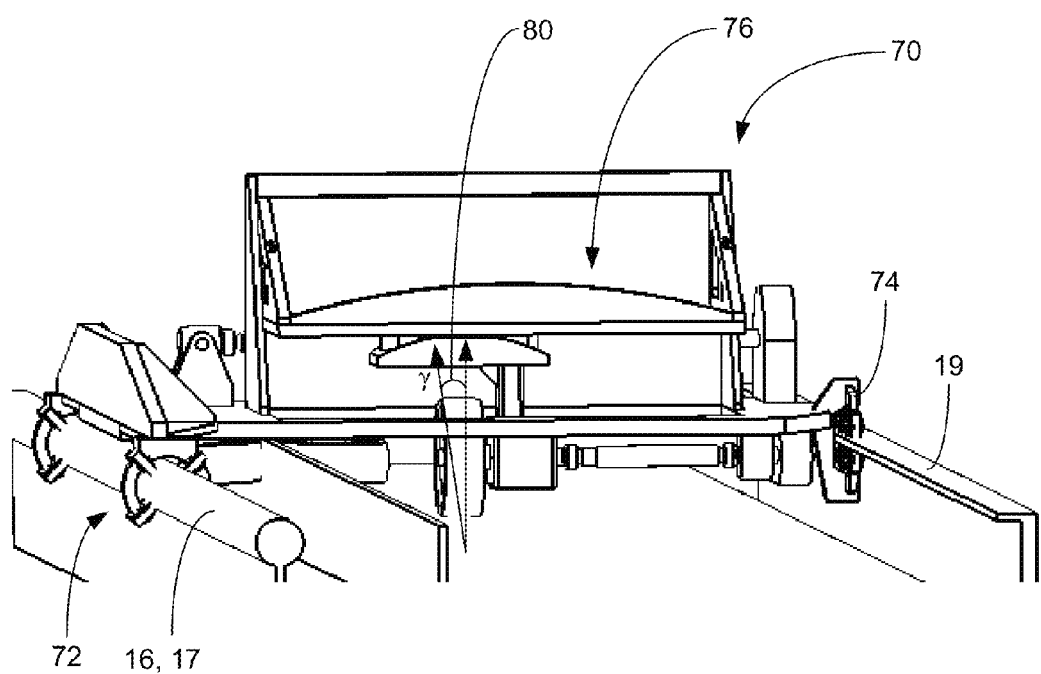
FIG. 14 is another perspective view of one exemplary embodiment of a carriage of the tire testing systems of the present invention.

Referring to FIGS. 12-14, the first challenge is to ensure that the carriage 70 which translates down the rail 16 is minimally but sufficiently constrained, so that the only designed degree of freedom is the longitudinal motion in the x-direction. This is achieved through very careful design, since using two rails such as are common in the roller coaster industry would be subject to motion errors if the rails were not exactly parallel and equidistant at all times. There are two sets of bogies (rollers) 72 on the main rail 17, and one set 74 on the opposing rail 19. The two sets 72 on the main rail 17 are sufficient to constrain lateral motion, vertical motion, pitch motion, and yaw motion for the carriage 70, regardless of the relative position of the opposite rail 19. The bogie 74 on the opposing side constrains only the vertical motion, therefore completing the restraint of roll and vertical displacement. This system is robust against thermal expansion, reduces the importance of alignment of one rail to the other, and enables optimal preloading to reduce compliance in the system.

The carriage components including the longitudinal translation stage (carriage 20 translating on rail 16), vertical stage 76 (provides normal loading through hydraulic actuator), lateral translation stage, rotary turn table 78 (for steer), and camber pivot 80. The rotary and camber degrees of freedom are actuated through displacement actuators.

The present invention also provides a method for positively controlling slip ratio with minimal energy input via a positive contact device that controls the relative slip between two objects (for example, a tire and a road surface) through a gear train such that slip is restricted to the region between those two objects. The gear train is used to alter the relative displacement (angular, translational, or other) or velocity of one object over the other in a fixed, known ratio. The gear train can be used to replace independent force or torque-based drives for the two objects, thereby eliminating unwanted dynamics due to lack of stiffness and robustness in those drives.

Tire testing machines today typically control velocities of the road (or trailer) while also controlling the rotational velocity of the tire, and then measure the resulting slip ratio (rather than controlling it directly). Unfortunately, system dynamics make it very difficult to control the two velocities relatively and accurately. In addition, using the tire testing carriage as an example, two motors are needed for this scenario, one to drive the carriage, and the other to drive the test wheel. Each motor must generate significant power to overcome the speed requirements, since Power=Torque×$\omega$. Even small torques can require large power if the speeds are high.

To explain the difficulty, consider the following example. First, realize that the slip ratio is a function of the difference in the velocity of the carriage and the tangential velocity of the tire, or, the difference in the displacement of the carriage and the tangential displacement of the tire over a given increment in time. This is the parameter that you are trying to control, with two, independent force (or torque) inputs.

This is analogous to trying to move a table with rubber feet an exact distance. Say you wish to move that table 1.1 mm to the right. If you push on the table, it will resist movement until the friction gives way, and you will likely grossly overshoot the target 1.1 mm. On the other hand, if you attached a screw device to a rigid frame of reference and then screwed the table over, you would be much more likely to hit your target. In the first scenario, you are trying to hit a displacement target with force inputs. In the second, you will be much more successful because you have provided a stiff, controlled displacement input. This is the approach the present design takes.

Figure 15:
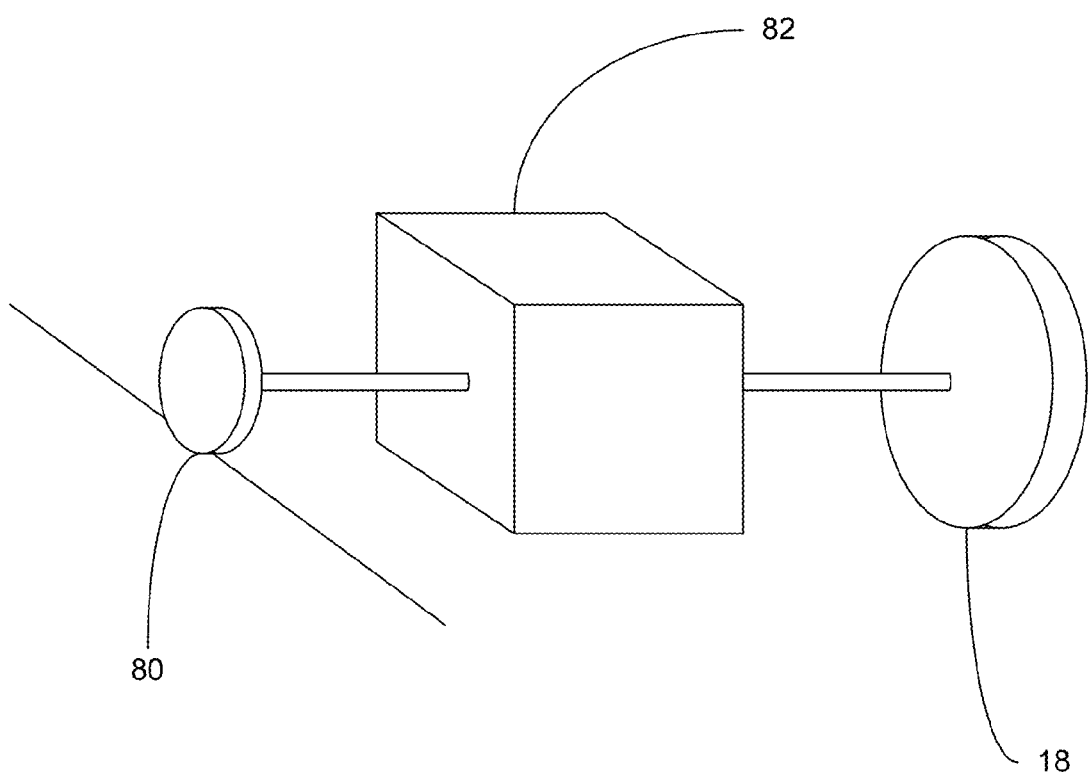
FIG. 15 is a schematic diagram illustrating one exemplary embodiment of a system for deterministically setting the slip ratio regardless of velocity of the present invention.
Figure 16:
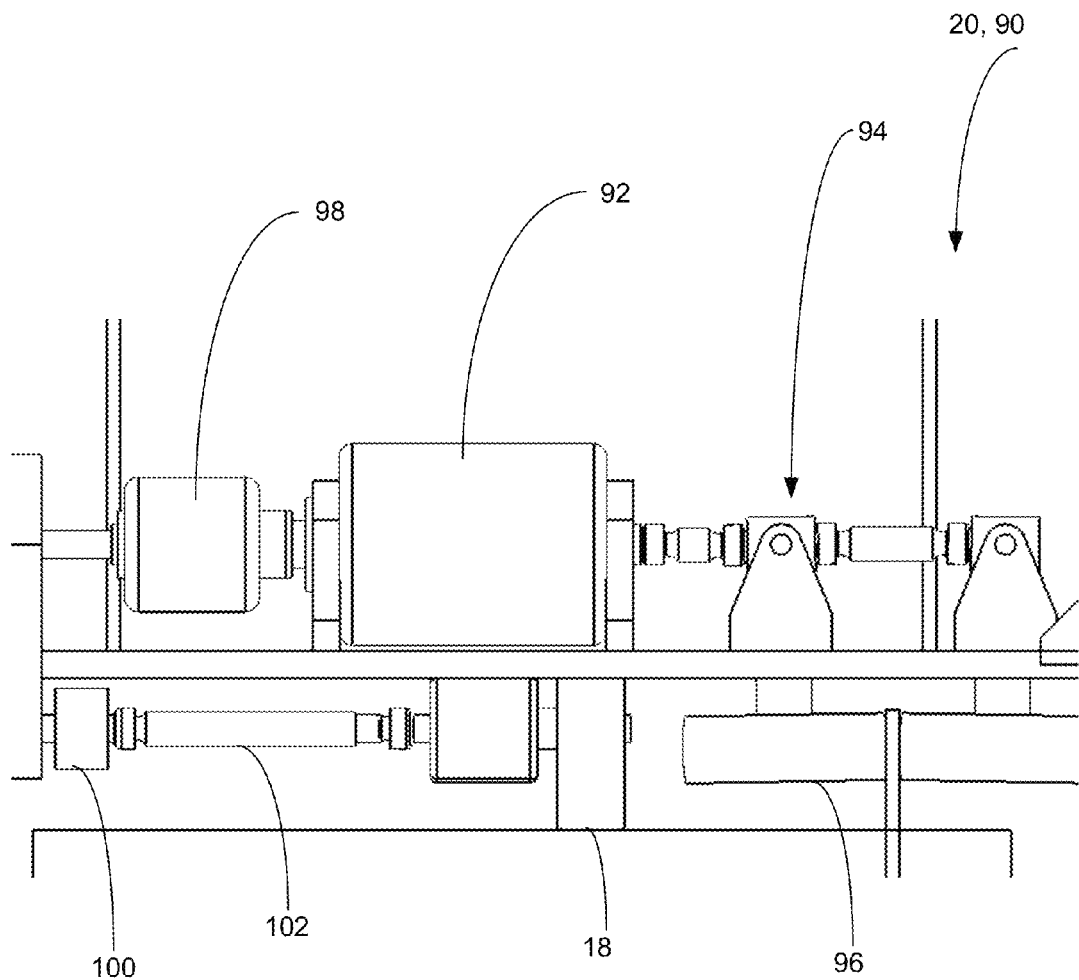
FIG. 16 is a front planar view of one exemplary embodiment of a drive system for the carriage of the tire testing systems of the present invention.

The present invention provides a method for deterministically setting the slip ratio regardless of velocity. The method is best explained by the very simple representation shown in FIG. 15. In FIG. 15, assume that the gear 80 and the test tire 18 have the same diameters. Also assume that they act under pure rotation, and the gearbox (a continuously variable transmission, or CVT, or a planetary gear set) 82 translates at a specified velocity. The CVT 82 can provide gear ratios greater or less than one, but rather than doing so in discrete increments, it can do so in infinitesimally small increments. If the gear ratio of the CVT 82 is varied to 1.1:1 rather than 1:1, then the test tire will rotate slower than the gear, resulting in a braking condition. Changing the gear ratio to 0.99:1 would then represent a driving condition.

Slip ratio is defined in a number of ways by different standards, but one way to express it is Slip Ratio %=[(Vehicle Speed−Wheel Speed)/Vehicle Speed]×100, where all velocities are linear. If the CVT gear ratio is set to 1.1:1 (input speed to output speed), then the gear, which is moving at the same linear velocity as the carriage, is moving faster than the linear velocity of the tire, which must therefore be experiencing slip in the contact patch as it "brakes". Since the vehicle velocity is:

v=ωRgear, the slip ratio therefore becomes:

Slip Ratio %=[(1.1ωRgear−1.0ωRtire)/1.1ωRgear]× 100, or 9%.

Note that the slip ratio is the controlled parameter rather than a parameter calculated from trying to control two independent velocities. Note too that the slip ratio will be independent of carriage velocity.

Using the carriage and gearing systems described above, an overall test carriage 20 is presented in FIG. 8. The figure shows the drive system 90 for the carriage, as well as the coupled variable gear ratio test tire drive. A single motor 92 with dual output shafts is oriented horizontally (although obviously there could be numerous perturbations for this design). A drivetrain 94 takes the output from the motor drive 92 on the right hand side to a set of tires, gear, or other tractive device 96 that is used to propel the carriage down the track. The output on the left side in the figure is attached to a transmission (planetary gear set or CVT) 98 which is then attached to a gear train or chain and sprocket set 100 to provide torque to the telescoping driveshaft 102 and test tire 18. The CVT 98 controls the slip ratio through the gear ratio value. Any slip in the drive system 90 propelling the carriage 20 can be measured using an external metrology reference (for example, measuring the velocity of the carriage 20 directly rather than the rotational speed of the tires).

Figure 17:
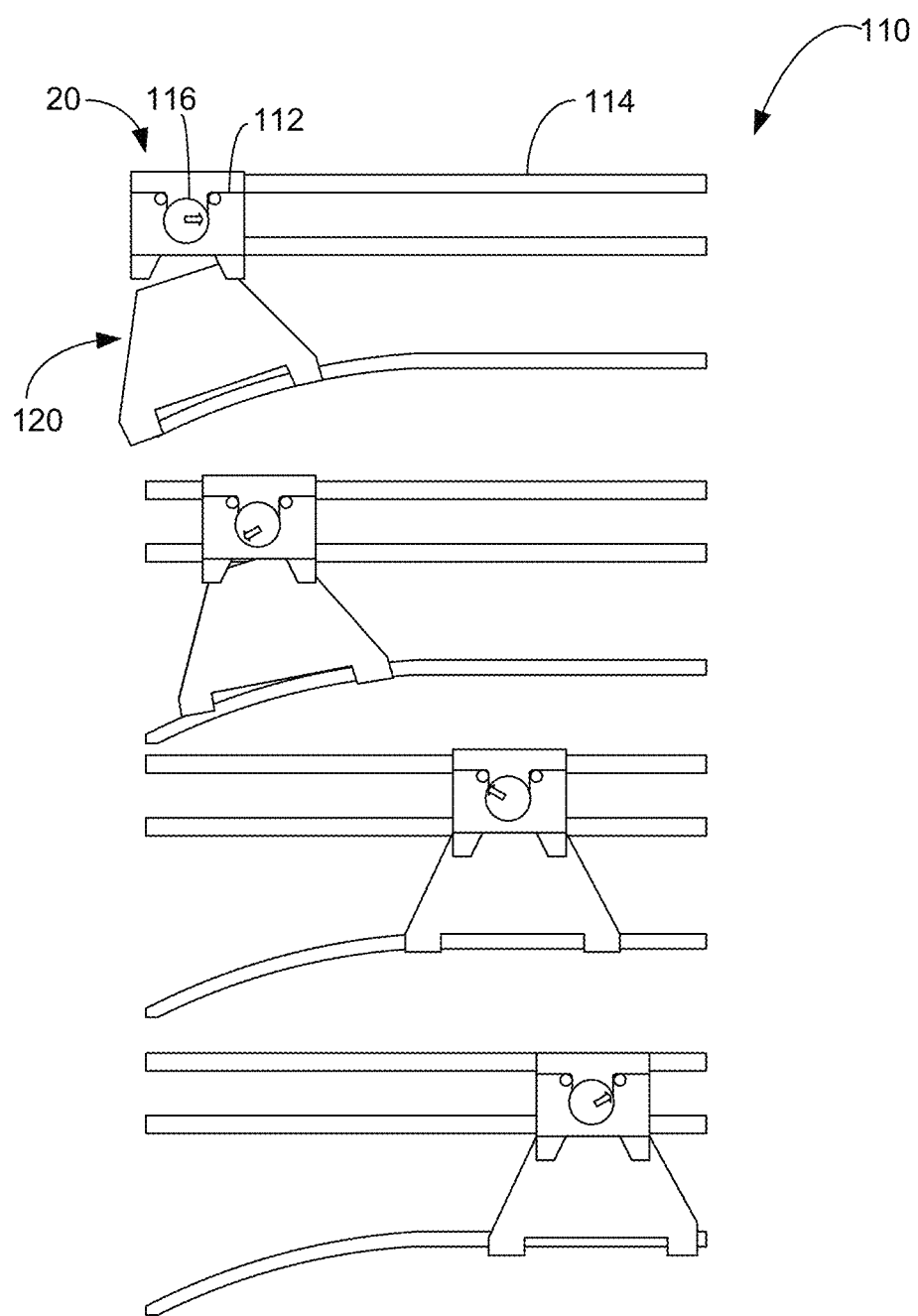
FIG. 17 is a series of side planar views of one exemplary embodiment of a high-speed cable drive system for the carriage of the tire testing systems of the present invention.

FIG. 17 illustrates the concept for a high-speed cable drive system 110. In this system 110, the cable 112 remains relatively stationary with regards to the track, rail, or ground 114. The purpose is to avoid issues with moving the cable 112 at high speeds around a pulley system and risking it jumping the supporting pulley structure. A motorized rotating drum 116 is mounted on the carriage 20, and the cable 112 is rotated around the drum 116 and tensioned with an idler pulley. As the drum 116 begins to rotate, friction between the cable 112 and the drum 116 minimizes slip, and the carriage 20 is pulled along the track. In this case, sections of the cable 112 remain stationary until the carriage 20 approaches that particular section. Once the carriage 20 arrives at that section, that section of the cable 112 will rapidly circulate around the drum 116 but will then return to rest against the rail 114. The cable 112 can either be fixed on two extremes of a linear track or, in the case of an oval or circular track, tensioned such that significant friction between the cable 112 and the track prevent the cable 112 from slipping relative to the track. The illustrated configuration also shows the ability to couple a separate carriage 120 to the driven carriage 20.

In one exemplary embodiment, the present invention further provides a methodology to accurately control slip ratio for tire testing machines. Tire testing machines are routinely used to measure the forces and moments generated by a tire in operation. Typical tire testing techniques include one of two methods: 1) mount the test tire on a movable spindle located beneath or behind a vehicle or a trailer, or 2) use a fixed lab system where the tire is run on a drum or a belt surface to replicate the tire/road surface.

Much of tire testing is conducted under a free rolling state, where no torque is applied to the test tire. However, tire forces and moments are extremely important under both driving and braking conditions. The trailer and vehicle-based systems typically do not have much capacity for braking and none for driving due to the mechanisms, power, and complexity required. Only a few belt machines attempt to provide driving or braking torque. However, such torque data is vitally important to auto manufacturers, race teams, and anyone doing simulations, and it is almost exclusively based on the independent variable, slip ratio.

Slip ratio is defined in a number of different ways, but, in general, represents the ratio of the linear velocity of the tire in the contact patch with the actual linear velocity of the vehicle (or the linear velocity of the belt).

Currently, belt systems struggle to maintain a constant or controlled slip ratio. There are many reasons for this. First, these belt systems consist of two independent drive/brake systems with their own controllers designed to maintain constant torque on either the test tire or the belt. One drive motor (usually hydraulic or electric) is located on the spindle and provides driving torque to the test tire, or a braking system is used to provide the braking torque. A separate drive motor/controller system is used to maintain the velocity of the belt system.

The challenge with this configuration is in maintaining a consistent slip ratio. Since the tire/belt interface contains a highly variable, stick-slip dynamic, it becomes difficult to maintain a constant velocity in either the test tire or the belt (or drum). This results in a very "noisy" calculation of slip ratio, with reported results jumping from slip ratios of 11% to 7% in a single data point.

Figure 18:
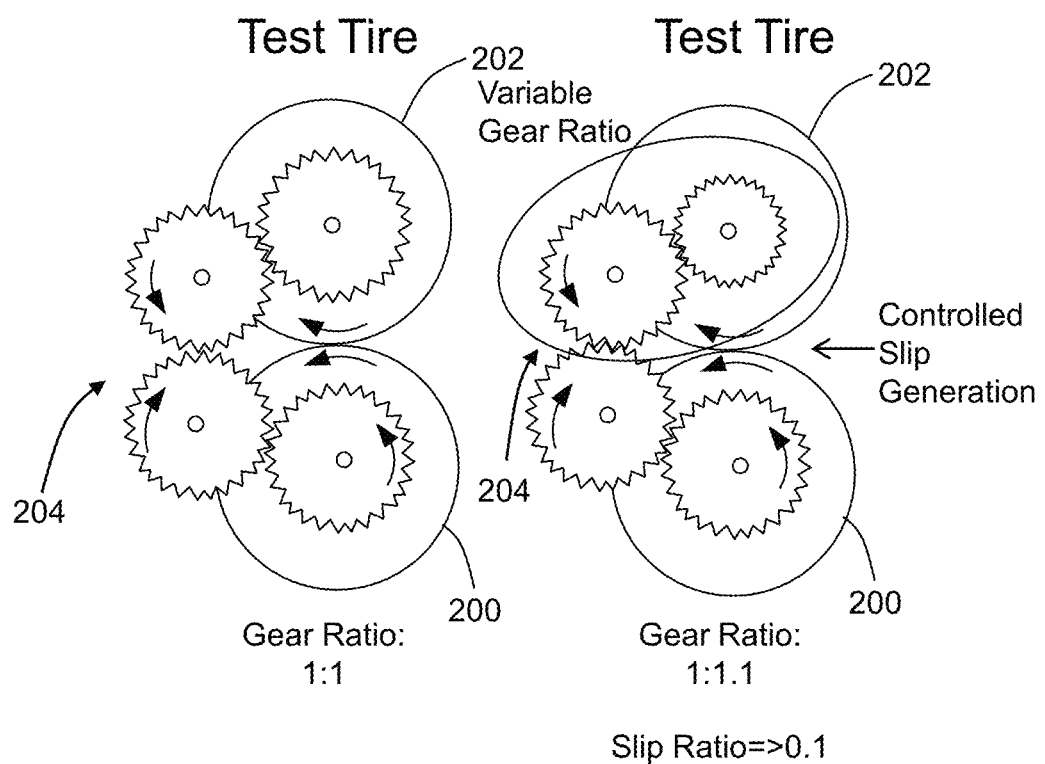
FIG. 18 is a schematic diagram illustrating one exemplary embodiment of the dynamic slip ratio control system and method of the present invention, which utilizes displacement inputs, rather than torque inputs.

The approach of the present invention is, in essence, to provide displacement inputs, rather than torque inputs. This is illustrated in FIG. 18. In this configuration, the drum, belt, or vehicle 200 is coupled with the test tire 202 with mechanical gearing 204. In this scenario, the velocity of the test tire 202 is mechanically linked, through some predetermined gear ratio, with the velocity of the drum, belt, or vehicle 200. The mechanical link 204 ensures that the slip ratio is carefully controlled and consistent, although the torques on the test tire 202 and drum, belt, or vehicle 204 may be highly dynamic. If the gearing mechanism 204 is such that it can be changed dynamically through computer control or other, then the slip ratio can be carefully controlled and dynamically changed during a test, providing the ability to "dial in" the required slip ratio with high resolution, as has not been previously possible.

This dynamic slip ratio control would provide the first capability to provide smooth, clean tire data based on the slip ratio independent variable. This improvement would significantly improve the ability to simulate the performance of a vehicle, since most simulations pull data based on the input slip ratio.

Figure 19:
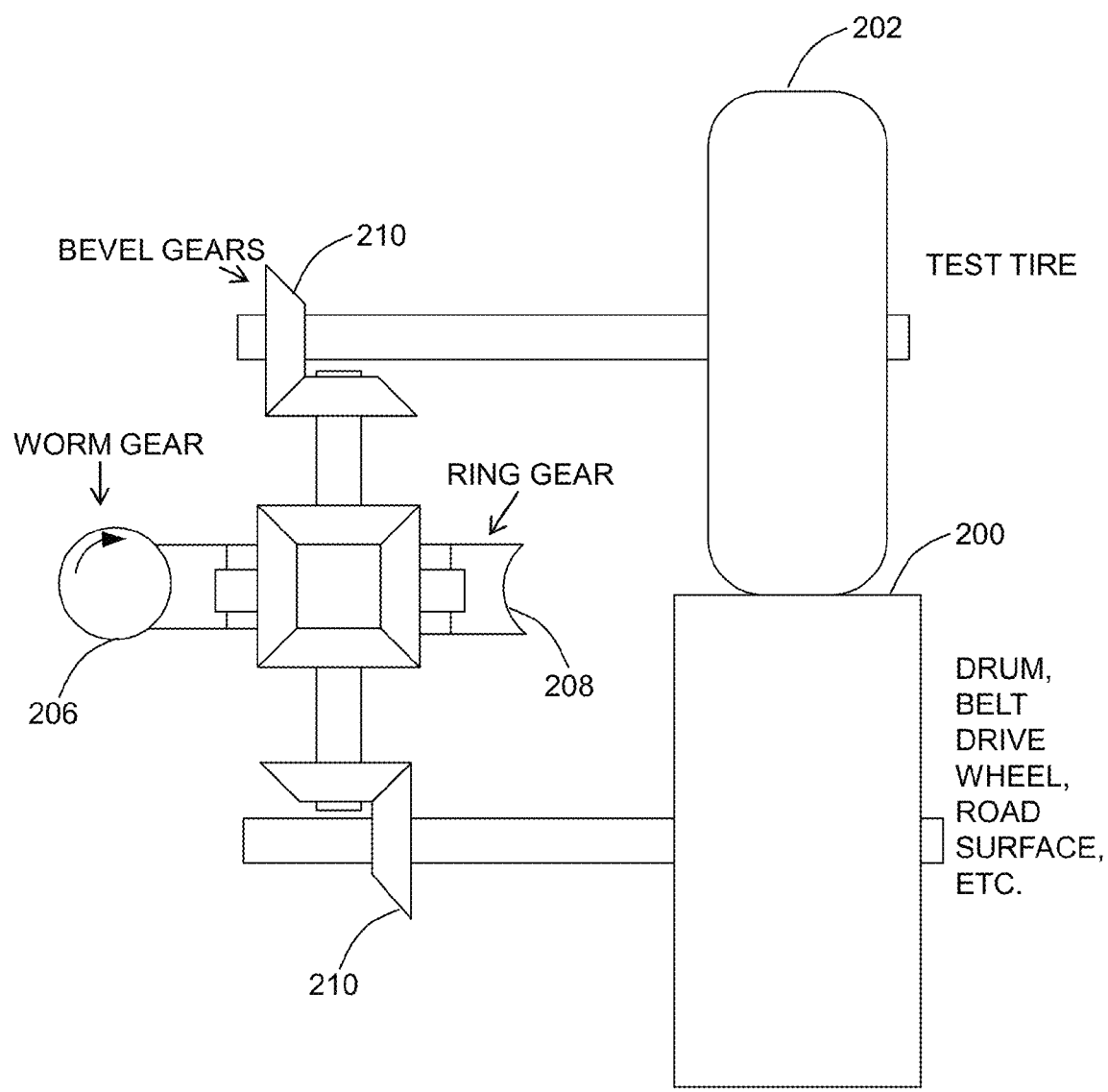
FIG. 19 is another schematic diagram illustrating one exemplary embodiment of the dynamic slip ratio control system and method of the present invention, which utilizes displacement inputs, rather than torque inputs.

This slip ratio control can be realized through a variety of different gear mechanisms and arrangements 204. For example, the variable gear ratio could be achieved through the implementation of a continuously variable transmission, or CVT. A second arrangement could include that illustrated in FIG. 19, wherein the drum, belt, drive wheel, or road surface 200 is coupled to the test tire 202 via a worm gear 206, a ring gear 208, and a plurality of bevel gears 210, as illustrated.

The above concept involves:
1) The use of a mechanical drive to control the ratio of speeds between the test tire and the "road surface" (that could be an actual road through the velocity of the vehicle, or a simulated road such as a drum or belt, or other).
2) The use of a mechanical, electrical, or other mechanism that provides a mechanical advantage to better control these ratios, i.e. replacing the use of torque motors with a mechanically linked ratio of speeds.
3) The mechanism allows dynamic modification of the gear ratio, and therefore the slip ratio. This dynamic modification can be through computer control, some form of actuation, or other means. Any mechanism that allows the modification of gear ratio without stopping or slowing the test tire is contemplated herein.
4) The mechanism allows an "infinitely variable" gear ratio, rather than a set number of gear ratios (such as a collection of sprockets, such as on a bike).

Figure 20:
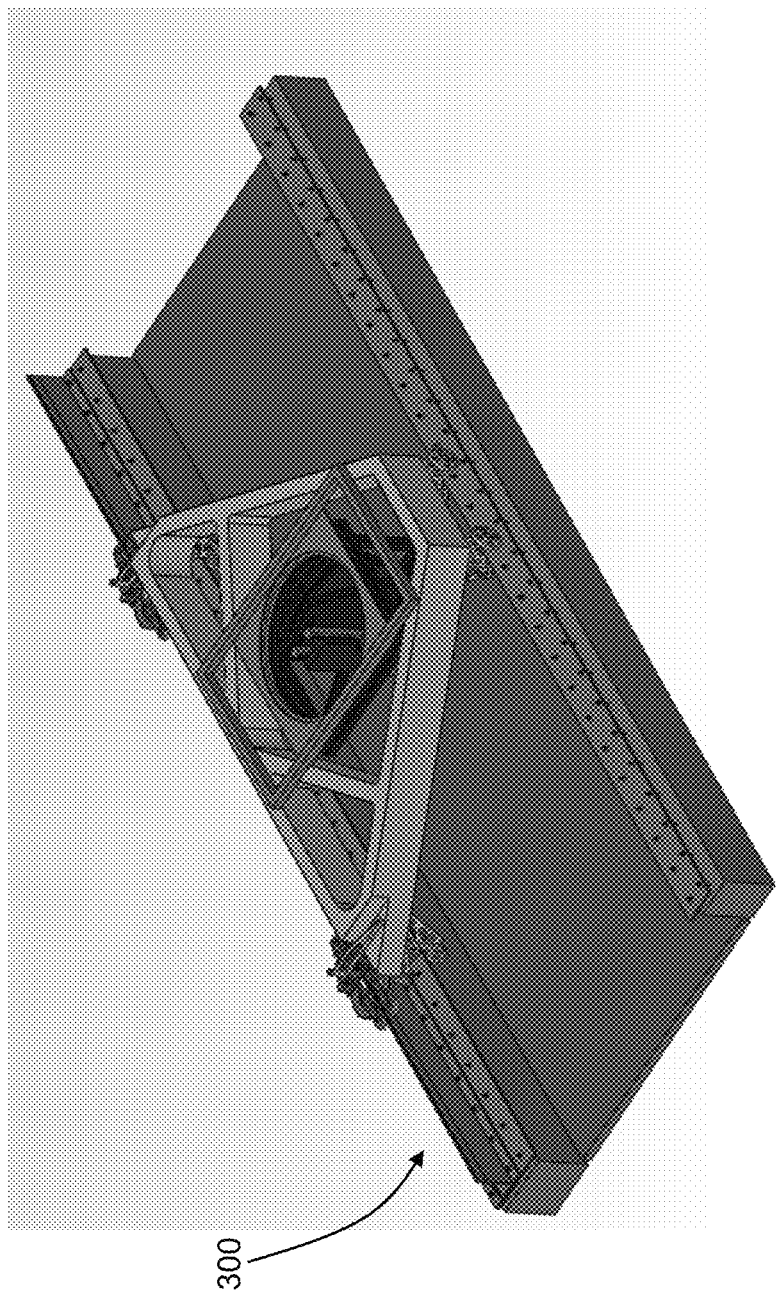
FIG. 20 is a schematic diagram illustrating one exemplary embodiment of a rail structure used in conjunction with the tire testing systems and methods of the present invention.
Figure 21:
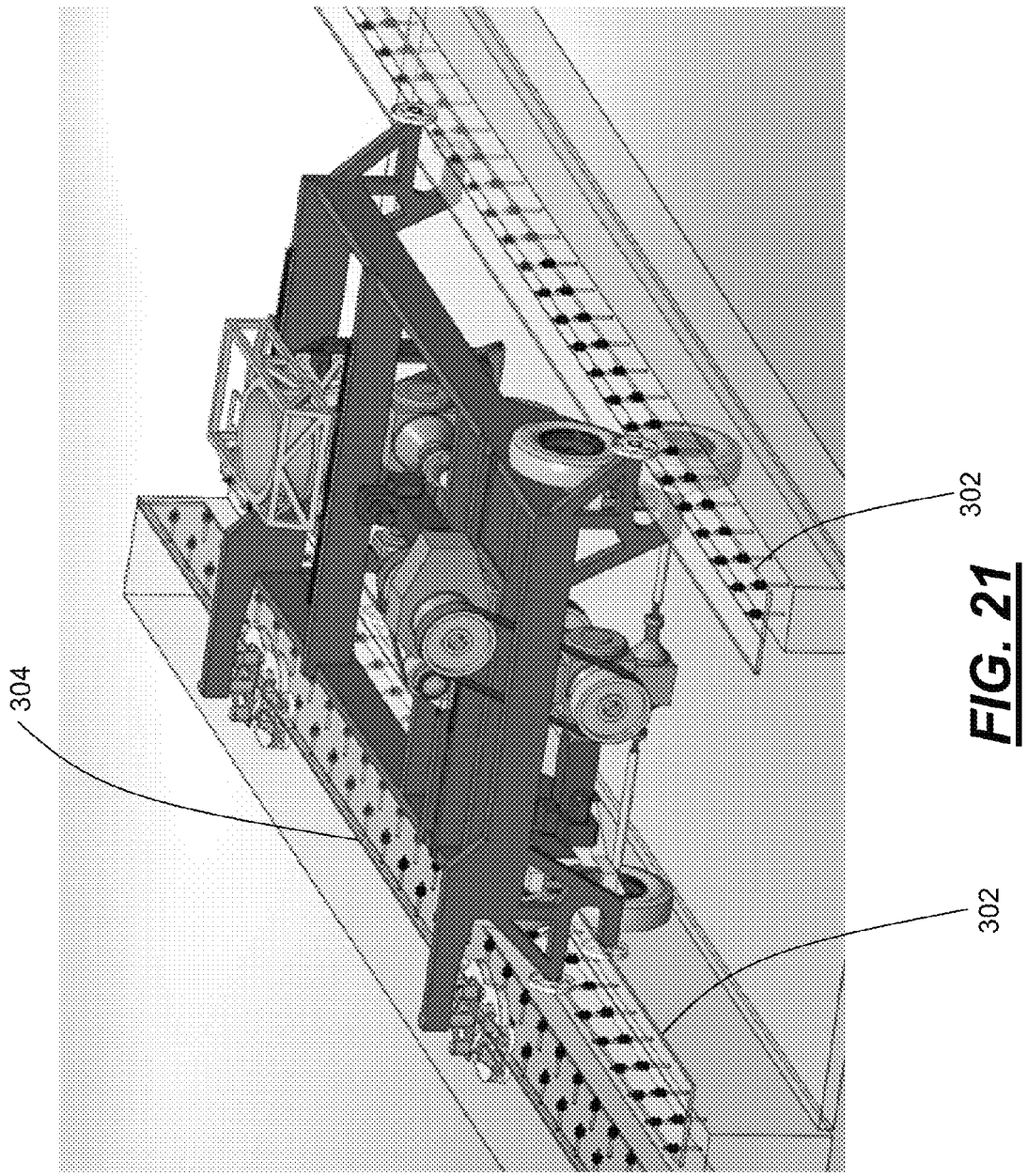
FIG. 21 is a schematic diagram illustrating another exemplary embodiment of a rail structure used in conjunction with the tire testing systems and methods of the present invention.
Figure 22:
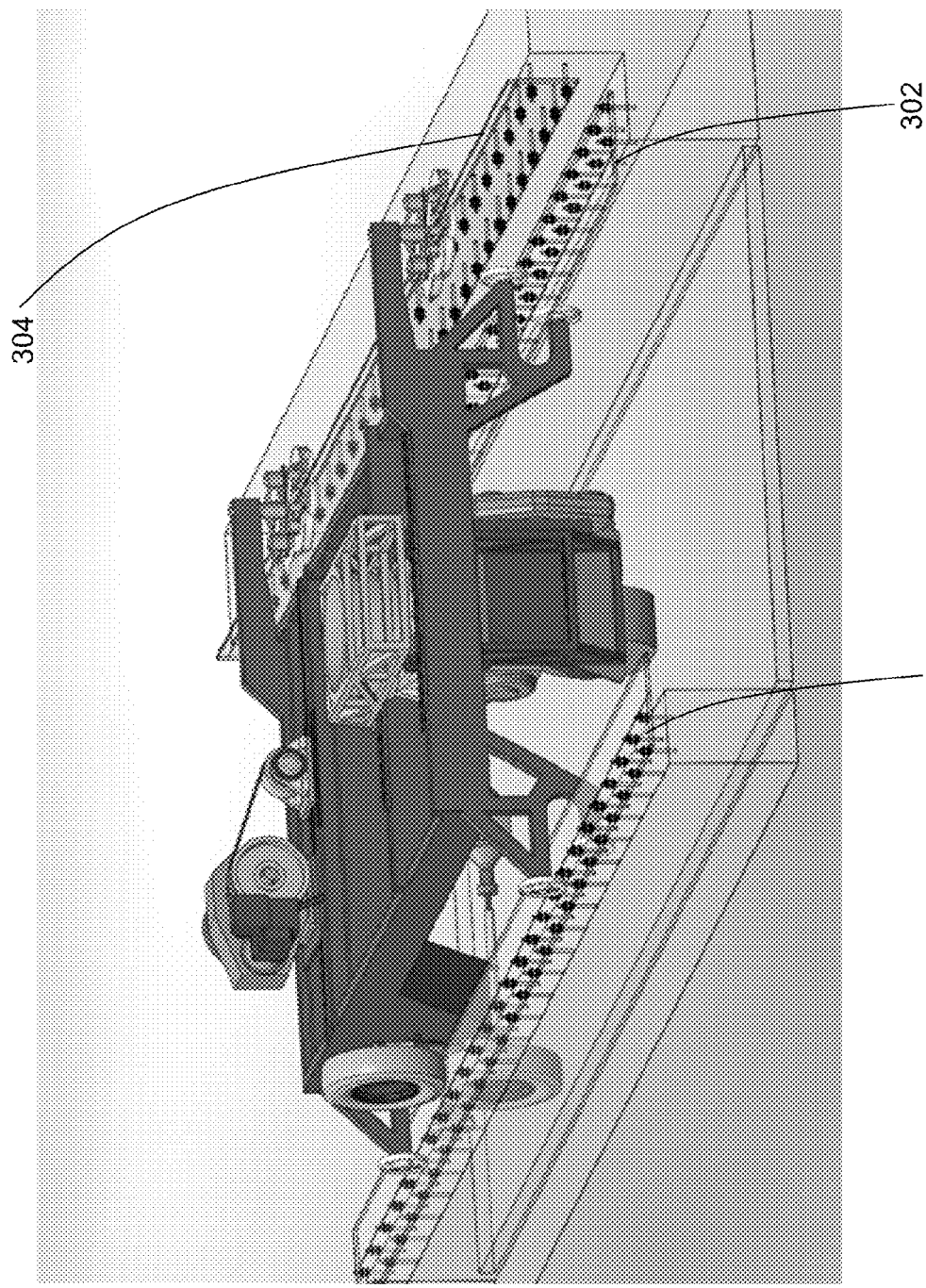
FIG. 22 is another schematic diagram illustrating another exemplary embodiment of a rail structure used in conjunction with the tire testing systems and methods of the present invention.
Figure 23:
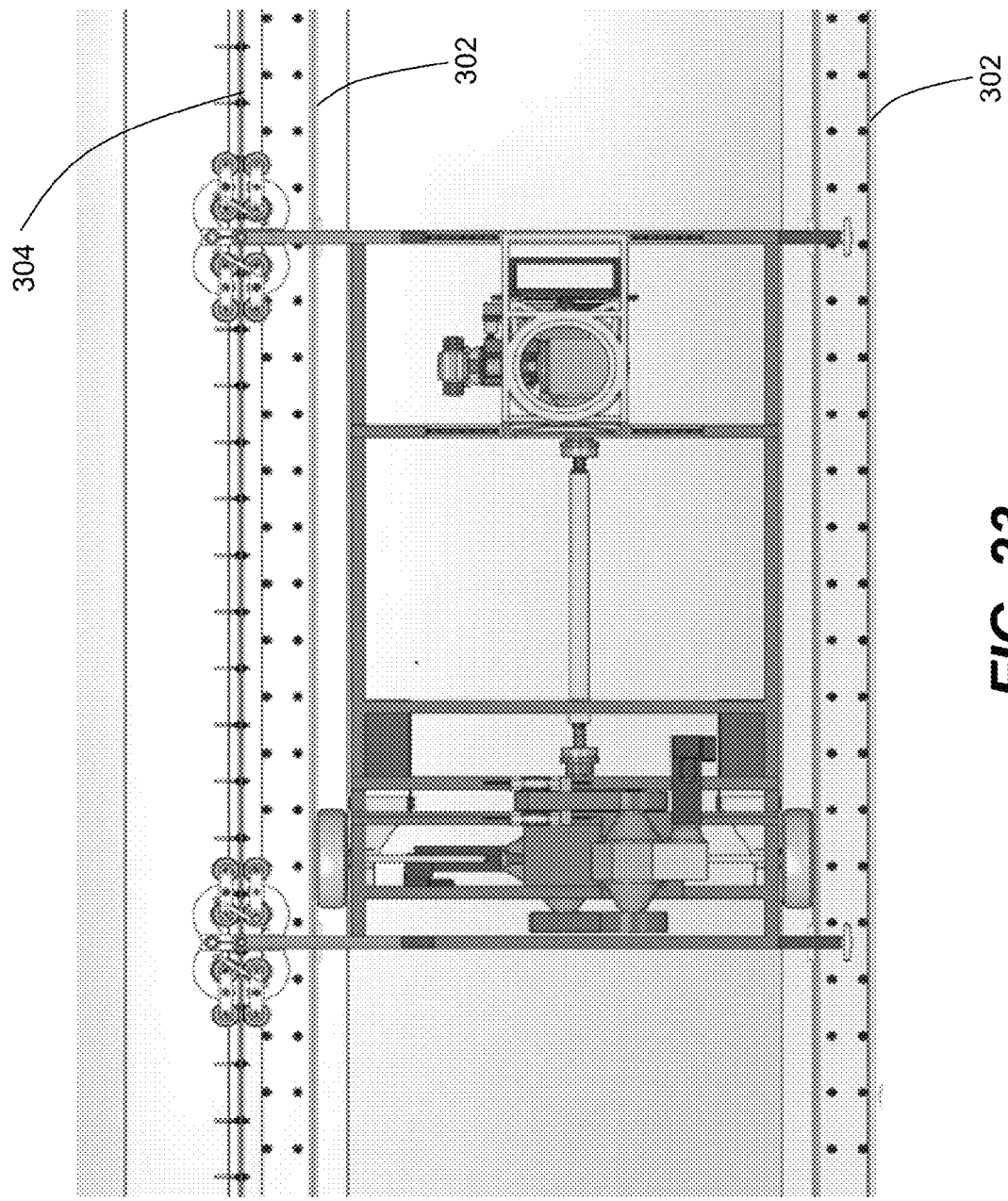
FIG. 23 is a further schematic diagram illustrating another exemplary embodiment of a rail structure used in conjunction with the tire testing systems and methods of the present invention.
Figure 24:
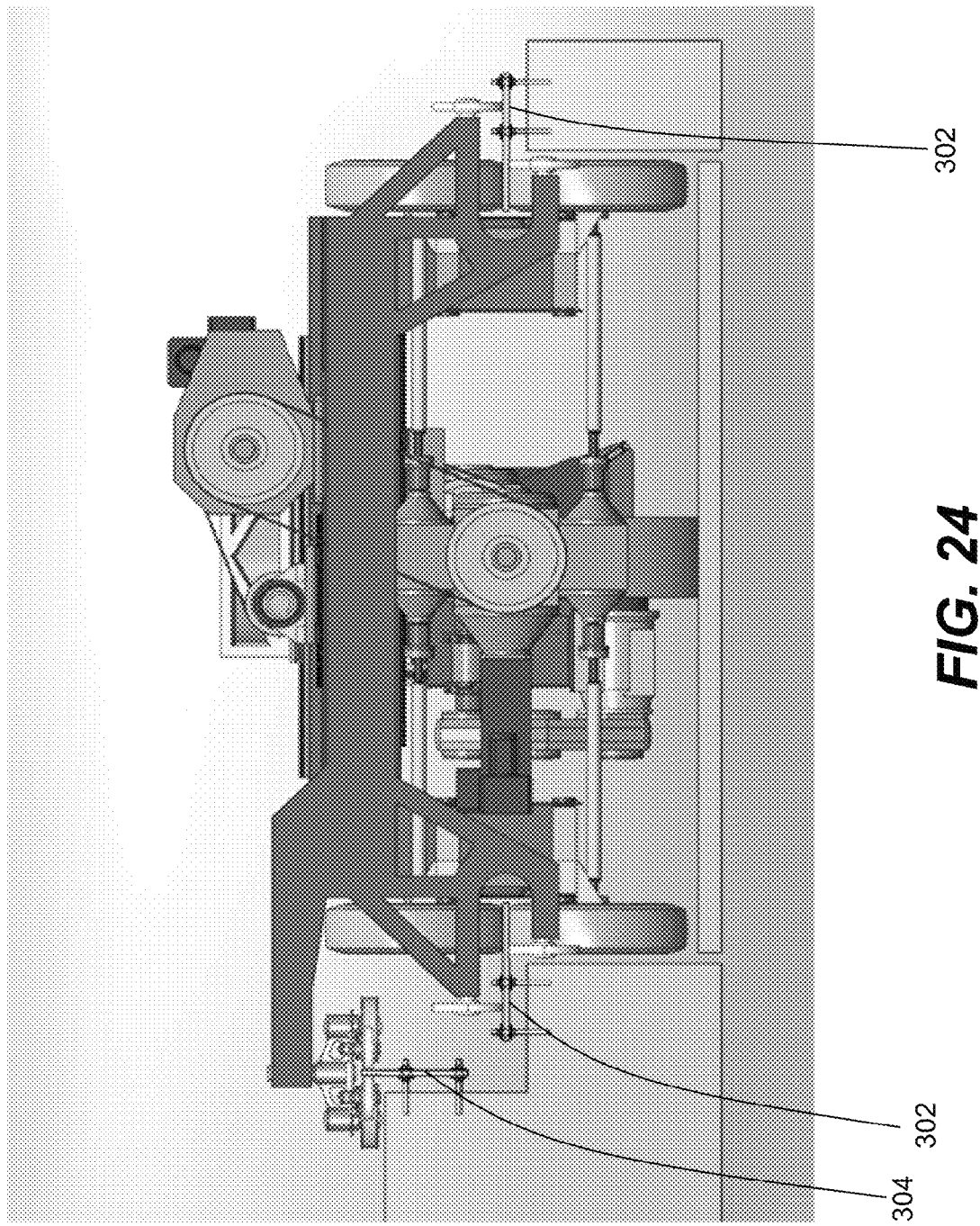
FIG. 24 is a still further schematic diagram illustrating another exemplary embodiment of a rail structure used in conjunction with the tire testing systems and methods of the present invention.

In general, railed tire testing facilities have previously been illustrated and described that utilize a pipe or "T" shaped rail. The present invention also contemplates a refined rail for use in such railed tire testing facilities. This allows for the associated carriage to be minimally, but sufficiently, constrained. Referring specifically to FIG. 20, the "T" shaped rail 300 significantly aids with precision because one can control the thickness of the plates reasonably well. The problem is that fabricating the "T" is difficult and expensive. It is shown bolted here, but is more affordable when welded, and that has its own difficulties, including still be expensive and having severe warping problems.

Referring to FIGS. 21-24, what is suggested is that the flat plates of the "T" are separated into substantially horizontal plates 302 and substantially vertical plates 304, each independent of one another, such that full adjustability of both horizontal and vertical rails is provided, and saving on welding, etc. As illustrated, the lateral positioning of the rail can be easily adjusted using the anchors to "dial in" and straighten the track. The same is true for the horizontal tracks. This design would be suitable for any railed mechanism where precision is important.

One requirement of the tire testing systems and methods of the present invention is a manipulator assembly that is capable of orienting and loading a tire as a vehicle would, especially in conformance with the Society of Automotive Engineers (SAE) standard coordinate system. A key aspect of this standard coordinate system is that the z-axis is always normal (i.e. perpendicular) to the ground plane, and located through the center of the contact patch of the tire. This vertical axis is the vertical axis around which steer angle and slip angle are defined. Most conventional tire testing machines that utilize a belt surface or the like do not preserve this standard coordinate system, but must instead make corrections through machine motion. For example, as an A-frame tilts to provide camber, the steer axis tilts with it, such that the steer axis does not remain normal to the road surface. This is problematic.

Figure 25:
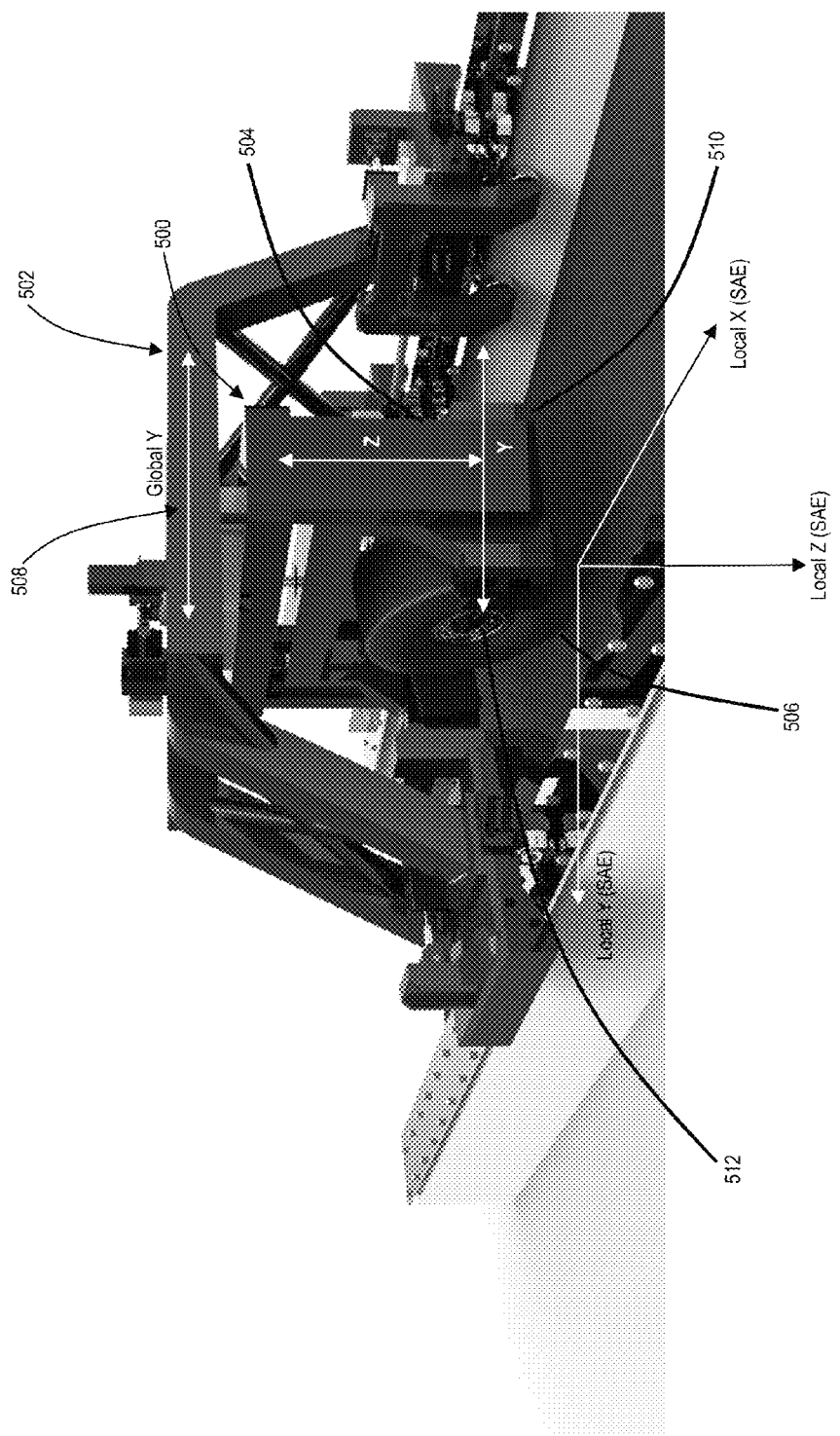
FIG. 25 is a perspective view of one exemplary embodiment of a manipulator assembly of the present invention (coupled to one exemplary embodiment of the carriage assembly of the present invention in this case).

FIG. 25 is a perspective view of one exemplary embodiment of the manipulator assembly 500 of the present invention (coupled to one exemplary embodiment of the carriage assembly 502 of the present invention in this case). The manipulator assembly 500 includes a linear actuator 504 for moving/displacing the tire 506 in the z-direction (i.e. SAE z-direction). This is pure displacement, and no correction is required. The manipulator assembly 500 also includes a linear actuator 508 for moving/displacing the tire 506 in the global y-direction (i.e. gross slideway-direction). Thus, pure displacement is provided. The manipulator assembly 500 further includes a linear actuator 510 for moving/displacing the tire 506 in the y-direction (i.e. SAE y-direction or scrub slideway-direction). Again, pure displacement is provided. This degree of freedom allows for the proper location of the center of rotation of the SAE coordinate system origin. The manipulator assembly 500 still further includes a rotary actuator 512 that allows for the tire 506 to be cambered about the SAE origin, also with displacement of the SAE y-direction linear actuator 510. Pure, as used herein, refers to motions conforming to the SAE coordinate system without corrective motions being required. Accordingly, pure vertical loading/displacement along the vertical axis (i.e. SAE z-axis), pure lateral motion/displacement along the SAE y-axis, pure camber rotation about the SAE coordinate system origin (by combined movement of the camber axis and the scrub actuators), and scrub offset can be provided. Although the manipulator assembly 500 of the present invention has been illustrated and described herein in a tire testing application, it should be noted that it could be used in a variety of other applications as well.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A manipulator assembly for moving and displacing a tire undergoing tire testing, comprising:
a linear actuator for moving and displacing the tire along a local vertical z-axis;
a linear actuator for moving and displacing the tire along a local lateral y-axis that is perpendicular to the local vertical z-axis;
a rotary actuator for cambering the tire within a local coordinate system partially defined by the local vertical z-axis and the local lateral y-axis; and
a linear actuator for moving and displacing the tire along a global lateral y-axis that is perpendicular to the local vertical z-axis such that the local coordinate system is moved and displaced along the global lateral y-axis;

wherein all degrees of freedom of the tire are independently controlled.

2. The manipulator assembly of claim 1, wherein the manipulator assembly is coupled to one of a carriage assembly, a fixed base, and a moving reference.

3. The manipulator assembly of claim 2, wherein the linear actuator for moving and displacing the tire along the global lateral y-axis moves and displaces the manipulator assembly with respect to the one of the carriage assembly, the fixed base, and the moving reference along the global lateral y-axis.

4. The manipulator assembly of claim 1, wherein the linear actuator for moving and displacing the tire along the global lateral y-axis moves and displaces an origin of the local coordinate system along the global lateral y-axis.

5. A method for moving and displacing a tire undergoing tire testing, comprising:
   providing a manipulator assembly, comprising:
      a linear actuator for moving and displacing the tire along a local vertical z-axis;
      a linear actuator for moving and displacing the tire along a local lateral y-axis that is perpendicular to the local vertical z-axis;
      a rotary actuator for cambering the tire within a local coordinate system partially defined by the local vertical z-axis and the local lateral y-axis; and
      a linear actuator for moving and displacing the tire along a global lateral y-axis that is perpendicular to the local vertical z-axis such that the local coordinate system is moved and displaced along the global lateral y-axis;
      wherein all degrees of freedom of the tire are independently controlled;
   moving the tire using the manipulator assembly; and
   collecting performance data associated with the tire.

6. The method of claim 5, wherein the manipulator assembly is coupled to one of a carriage assembly, a fixed base, and a moving reference.

7. The method of claim 6, wherein the linear actuator for moving and displacing the tire along the global lateral y-axis moves and displaces the manipulator assembly with respect to the one of the carriage assembly, the fixed base, and the moving reference along the global lateral y-axis.

8. The method of claim 5, wherein the linear actuator for moving and displacing the tire along the global lateral y-axis moves and displaces an origin of the local coordinate system along the global lateral y-axis.

* * * * *